(12) United States Patent
Nitto et al.

(10) Patent No.: US 12,405,444 B2
(45) Date of Patent: Sep. 2, 2025

(54) CONTROL APPARATUS, LENS APPARATUS, IMAGE PICKUP APPARATUS, CAMERA SYSTEM, AND CONTROL METHOD

(71) Applicant: CANON KABUSHIKI KAISHA, Tokyo (JP)

(72) Inventors: Kiyoshi Nitto, Saitama (JP); Yosuke Fukai, Kanagawa (JP); Taro Murakami, Tokyo (JP); Yusuke Fujiwara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 18/474,770

(22) Filed: Sep. 26, 2023

(65) Prior Publication Data

US 2024/0118516 A1 Apr. 11, 2024

(30) Foreign Application Priority Data

Sep. 30, 2022 (JP) .................................. 2022-157404
May 31, 2023 (JP) .................................. 2023-090520

(51) Int. Cl.
*G02B 7/34* (2021.01)
*G02B 7/06* (2021.01)
*G03B 13/36* (2021.01)
*H04N 13/207* (2018.01)
(Continued)

(52) U.S. Cl.
CPC .................. *G02B 7/34* (2013.01); *G02B 7/06* (2013.01); *G03B 13/36* (2013.01); *H04N 13/207* (2018.05); *H04N 13/296* (2018.05); *H04N 23/67* (2023.01)

(58) Field of Classification Search
CPC . G02B 7/34; G02B 7/06; G03B 13/36; H04N 13/207; H04N 13/296; H04N 23/67
See application file for complete search history.

(56) References Cited

U.S. PATENT DOCUMENTS

2006/0033990 A1* 2/2006 Kato .................. G02B 7/06
359/425
2009/0146045 A1* 6/2009 Yamaguchi ............ H04N 23/13
250/201.4
(Continued)

FOREIGN PATENT DOCUMENTS

JP 2009-175498 A 8/2009

*Primary Examiner* — Shahbaz Nazrul
(74) *Attorney, Agent, or Firm* — Cowan, Liebowitz & Latman, P.C.

(57) ABSTRACT

A control apparatus for a camera system that includes a lens apparatus including a first optical system and a second optical system and configured to move them relative to each other, and an image pickup apparatus including an image sensor and detachably attachable to the lens apparatus includes a processor configured to acquire a first evaluation value of the first optical system at a first focus detection position corresponding to the first optical system, determine a second focus detection position corresponding to the second optical system based on an first object image formed by the first optical system and a second object image formed by the second optical system, acquire a second evaluation value of the second optical system at the second focus detection position, and move the first optical system and the second optical system based on the first evaluation value and the second evaluation value.

35 Claims, 21 Drawing Sheets

(51) Int. Cl.
 *H04N 13/296* (2018.01)
 *H04N 23/67* (2023.01)

(56) References Cited

U.S. PATENT DOCUMENTS

2016/0295097 A1* 10/2016 Shanmugavadivelu ..................... H04N 23/45
2024/0137637 A1* 4/2024 Ebisawa ................ H04N 23/80

* cited by examiner

CONTROL APPARATUS, LENS APPARATUS, IMAGE PICKUP APPARATUS, CAMERA SYSTEM, AND CONTROL METHOD

BACKGROUND

Technical Field

One of the aspects of the embodiments relates to a control apparatus, a lens apparatus, an image pickup apparatus, a camera system, and a control method.

Description of Related Art

A lens apparatus has conventionally been known in which a pair of left and right optical systems are disposed apart from each other by a predetermined distance (base length), and two image circles are imaged in parallel on a single image sensor. For this lens apparatus, images formed by the pair of left and right optical systems are recorded as moving images or still images for the left eye and the right eye, respectively, and when viewed using a three-dimensional display, VR goggles, etc. during playback, the right eye of the viewer views the image for the right eye and his left eye views the image for the left eye. At this time, the images with parallax are projected to the right and left eyes due to the base length of the pair of left and right optical systems, so the viewer can acquire a stereoscopic effect.

The pair of left and right optical systems to capture images with parallax needs focusing for each of the pair of left and right optical systems.

Japanese Patent Laid-Open No. 2009-175498 discloses binoculars that uses a single operation member that switches between left and right diopter adjustment by moving one optical system and focusing by moving both optical systems.

The binoculars disclosed in Japanese Patent Laid-Open No. 2009-175498 performs the diopter adjustment and focusing by switching between them with a single operation member, and the operation becomes complicated and proper focusing is difficult due to erroneous operation.

SUMMARY

A control apparatus according to one aspect of the embodiment for a camera system that includes a lens apparatus including a first optical system and a second optical system and configured to move the first optical system and the second optical system relative to each other, and an image pickup apparatus including an image sensor and attachable to and detachable from the lens apparatus includes a memory storing instructions, and a processor configured to execute the instructions to acquire a first evaluation value of the first optical system at a first focus detection position corresponding to the first optical system, determine a second focus detection position corresponding to the second optical system based on an first object image formed by the first optical system and a second object image formed by the second optical system, acquire a second evaluation value of the second optical system at the second focus detection position, and move the first optical system and the second optical system based on the first evaluation value and the second evaluation value.

A control apparatus according to another aspect of the embodiment for a camera system that includes a lens apparatus including a first optical system and a second optical system and is configured to move the first optical system and the second optical system relative to each other, and an image pickup apparatus that includes an image sensor and is attachable to and detachable from the lens apparatus includes a memory storing instructions; and a processor configured to execute the instructions to acquire a first evaluation value of the first optical system at a first focus detection position corresponding to the first optical system, and move the first optical system and the second optical system based on the first evaluation value.

Each of a lens apparatus, an image pickup apparatus, and a camera system including the above control apparatus also constitutes another aspect of the embodiment.

Further features of the disclosure will become apparent from the following description of embodiments with reference to the attached drawings.

DESCRIPTION OF THE EMBODIMENTS

Figure 1:
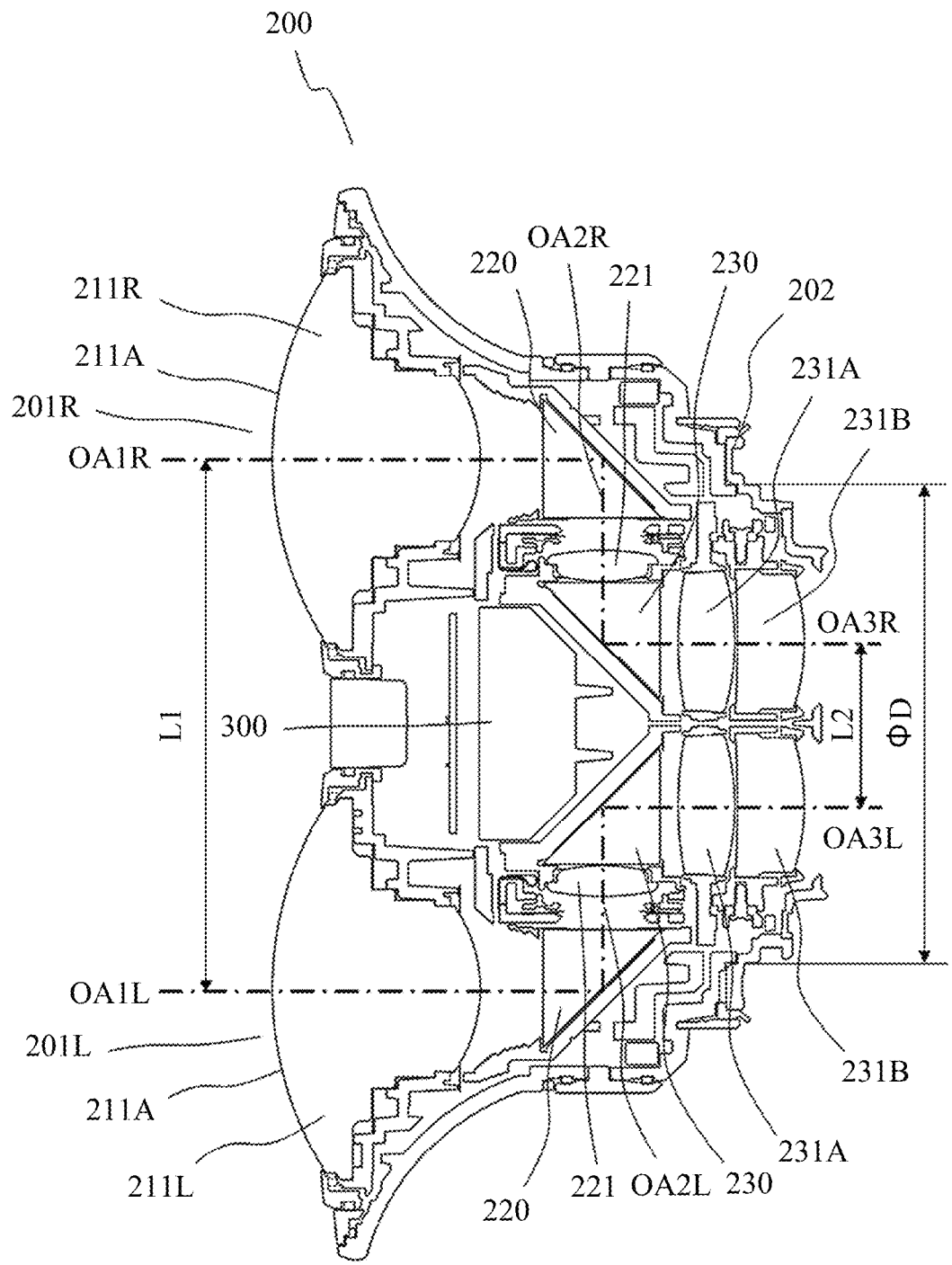
FIG. 1 is a sectional view of an interchangeable lens according to one embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

A camera system according to one embodiment includes a lens apparatus (interchangeable lens) that includes two optical systems (first optical system and second optical system) disposed in parallel (symmetrically), and an image pickup apparatus that configured to image two image circles in parallel on a single image sensor. The two optical systems are horizontally arranged, and separated by a base length. Viewed from the image side, an image formed by the right optical system (first optical system) is recorded as a moving or still image for the right eye, and an image formed by the left optical system (second optical system) is recorded as a moving image or still image for the left eye. By viewing a moving image or a still image (video) using a three-dimensional display, so-called VR goggles, or the like, the viewer's right eye views the right-eye image, and his left eye sees the left-eye image. At this time, images with parallax are projected to the right and left eyes due to the base length of the left and right optical systems, so the viewer can acquire a three-dimensional effect. Thus, the camera system according to this embodiment is a camera system for stereoscopic imaging that can form two images with parallax by the first optical system and the second optical system.

Figure 2A:
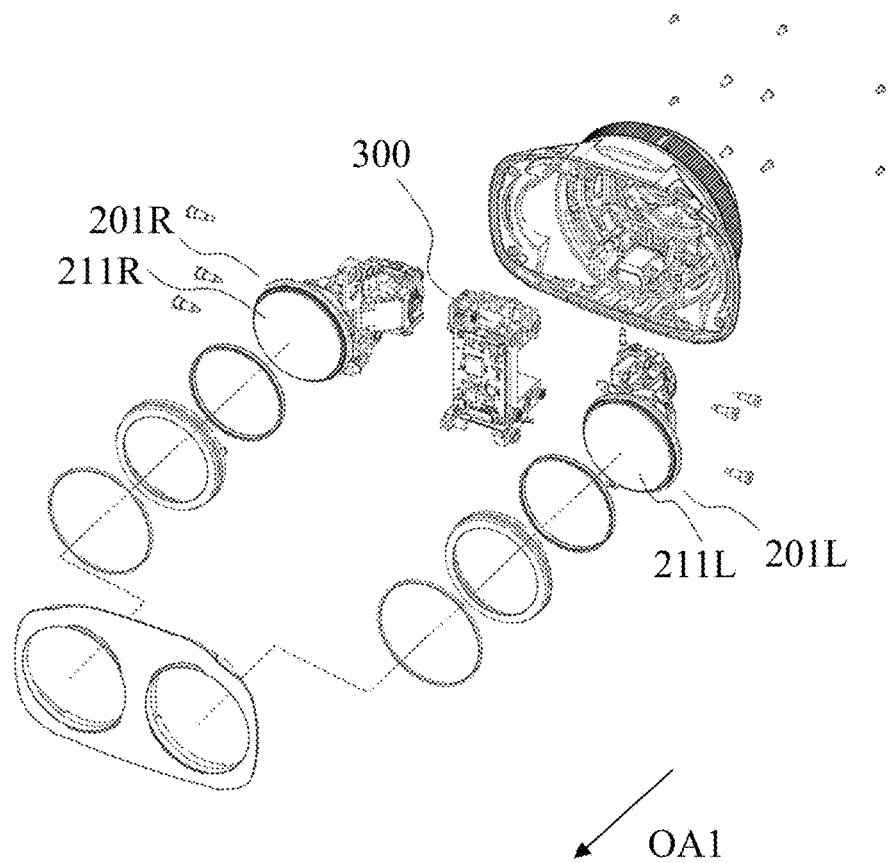
FIGS. 2A and 2B are exploded perspective views of an interchangeable lens.
Figure 2B:
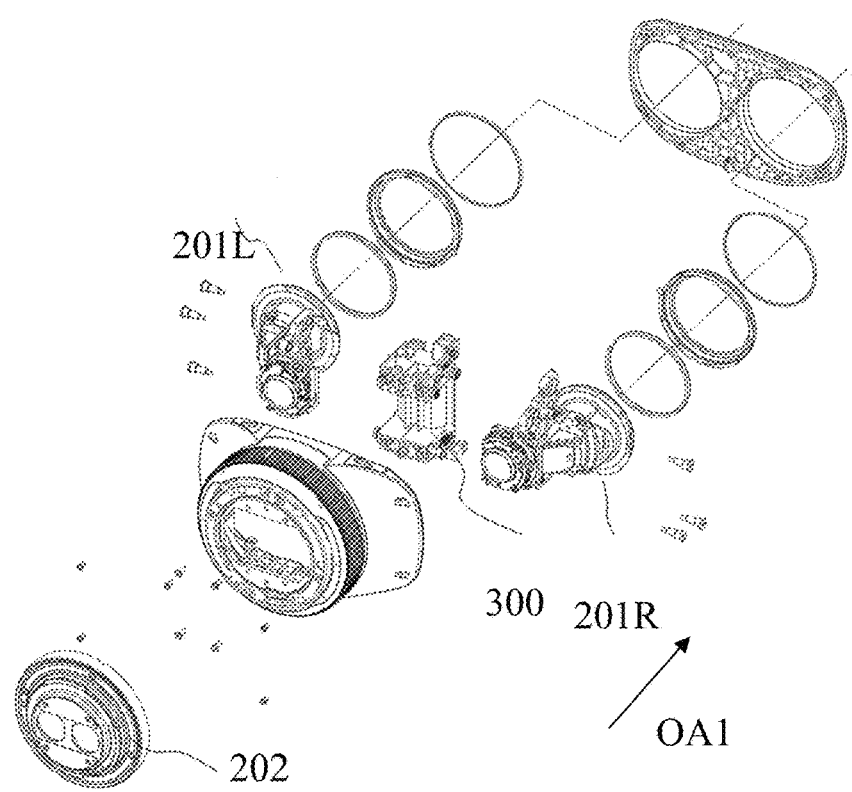

FIG. 1 is a sectional view of an interchangeable lens 200 according to one embodiment. FIGS. 2A and 2B are exploded perspective views of the interchangeable lens 200. In the following description, descriptions of the first optical system (right-eye optical system) are denoted by R, and descriptions of the second optical system (left-eye optical system) are denoted by L. Descriptions that are common to both the right-eye optical system and the left-eye optical system do not have the R or L suffix. Although the optical systems are disposed on the left and right sides in this embodiment, they may be disposed on the upper and lower sides.

The interchangeable lens 200 includes a first optical system 201R and a second optical system 201L. Each of the two optical systems is fixed to a lens top base 300 with a screw or the like, and is capable of imaging with an angle of view of 120 degrees or more. Each of the two optical systems has, in order from the object side, a first optical axis OA1, a second optical axis OA2 substantially orthogonal to the first optical axis OA1, and a third optical axis OA3 parallel to the first optical axis OA1. Each of the two optical systems includes a first lens (unit) 211 having a convex surface 211A on the object side disposed along the first optical axis OA1, a second lens (unit) 221 disposed along the second optical axis OA2, third lenses (lens units) 231A and 231B disposed along the third optical axis OA3. Each of the two optical systems further includes a first prism 220 that bends a light beam parallel to the first optical axis OA1 and guides it to the second optical axis OA2, and a second prism 230 that bends a light beam parallel to the second optical axis OA2 to the third optical axis OA3. In the following description, the optical axis direction is a direction parallel to the first optical axis OA1, which is the direction extending to the object side and the imaging surface side.

Figure 3:
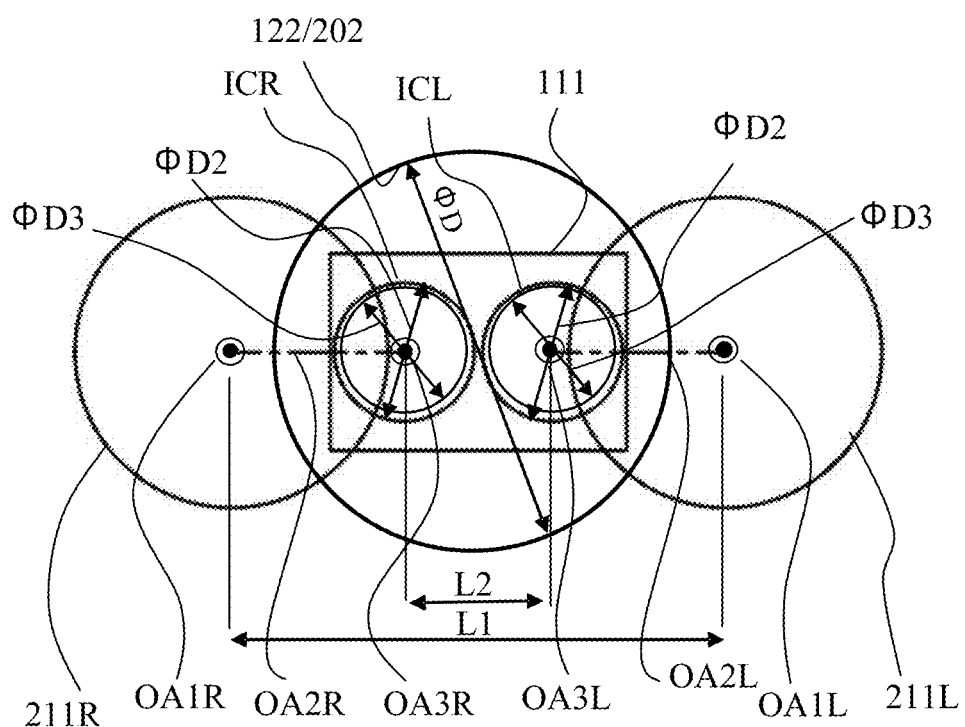
FIG. 3 illustrates a positional relationship between each optical axis and image circles on an image sensor.

FIG. 3 illustrates a positional relationship between each optical axis and image circles on the image sensor. A right-eye image circle ICR with an effective angle of view formed by the first optical system 201R and a left-eye image circle ICL with an effective angle of view formed by the second optical system 201L are arranged in parallel on an image sensor 111 of a camera body 110. A size OA2, of each image circle and a distance between the image circle may be set so that the image circles do not overlap each other. For example, the light receiving range of the image sensor 111 is divided into left and right halves with respect to the center, The center of the right-eye image circle ICR may be set to an approximate center of the right area of the light receiving range, and the center of the left-eye image circle ICL may be set to an approximate center of the left area of the light receiving range.

In this embodiment, each optical system is a full-circumference fisheye lens, and an image formed on the imaging surface is a circular image covering a range of angle of view exceeding 180 degrees, as illustrated in FIG. 3, two circular images are formed on the left and right sides. A distance between the first optical axis OA1R of the first optical system 201R and the first optical axis OA1L of the second optical system 201L is referred to as base length L1. The longer the base length L1 is, the more the stereoscopic effect becomes during viewing. For example, assume that a sensor size is 24 mm long×36 mm wide, a diameter of the image circle is Φ17 mm, a distance L2 between the third optical axes is 18 mm, and the length of the second optical axis is 21 mm. In a case where each optical system is arranged such that the second optical axis extends in the horizontal direction, the base length L1 is 60 mm, which is approximately equal to the interpupillary distance of an adult. The diameter 1D of the lens mount unit 202 may be shorter than the base length L1, and by making the distance L2 between the third optical axes shorter than the diameter ΦD of the lens mount unit 202, the three lens units 231A and 231B can be disposed inside the lens mount unit 202. That is, a relationship of L1>ΦD>L2 is established.

In viewing as a VR, the angle of view that gives a three-dimensional effect is about 120 degrees, but since a 120-degree field of view leaves a sense of discomfort, the angle of view is often increased up to 180 degrees. In this embodiment, the effective angle of view exceeds 180 degrees, and the size ΦD3 of the image circle in the range of 180 degrees is smaller than the size ΦD2 of the image circle.

Figure 4:
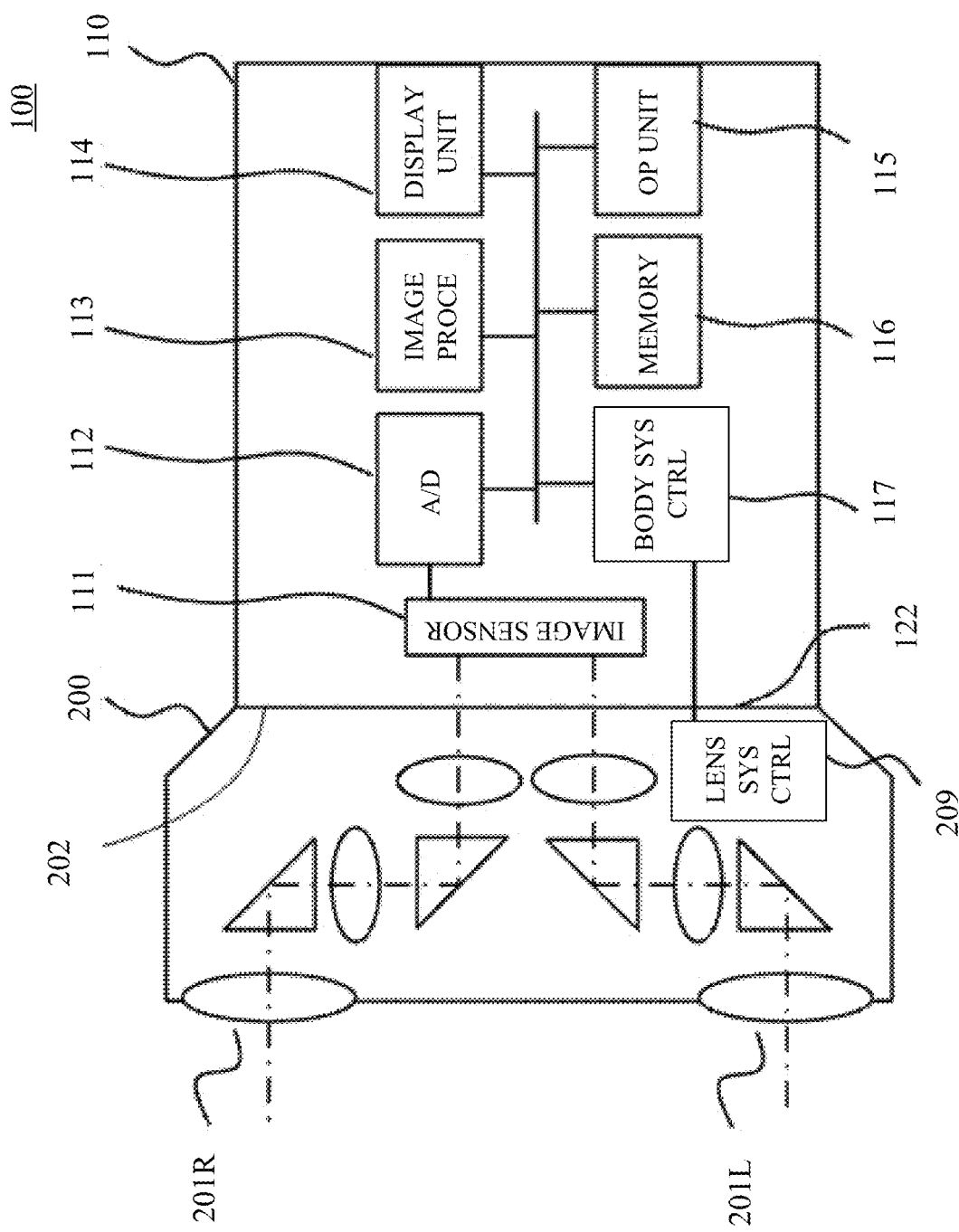
FIG. 4 is a schematic configuration diagram of a camera system according to one embodiment.

FIG. 4 is a schematic configuration diagram of the camera system 100. The camera system 100 includes an interchangeable lens 200 and a camera body 110 to which the interchangeable lens 200 is detachably attached.

The interchangeable lens 200 includes the first optical system 201R, the second optical system 201L, and a lens system control unit 209. The camera body 110 includes the image sensor 111, an A/D converter 112, an image processing unit 113, a display unit 114, an operation unit 115, a memory 116, a body system control unit 117, and a camera mount unit 122.

In a case where the interchangeable lens 200 is attached to the camera body 110 via the lens mount unit 202 and the camera mount unit 122, the body system control unit 117 and the lens system control unit 209 are electrically connected.

A right-eye image formed via the first optical system 201R and a left-eye image formed via the second optical system 201L are formed side by side on the image sensor 111 as object images. The image sensor 111 converts each formed object image (optical signal) into an analog electrical signal. The A/D converter 112 converts the analog electrical signal output from the image sensor 111 into a digital electrical signal (image signal). The image processing unit 113 performs various image processing on the digital electrical signal output from the A/D converter 112.

The display unit 114 displays various information. The display unit 114 is realized by using an electronic viewfinder or a liquid crystal panel, for example. The operation unit 115 functions as a user interface for a photographer to give instructions to the camera system 100. In a case where the display unit 114 has a touch panel, the touch panel also serves as the operation unit 115.

The memory 116 stores various data such as image data subjected to image processing by the image processing unit 113. The memory 116 also stores programs. The memory 116 is realized by using ROM, RAM, and HDD, for example.

The body system control unit 117 controls the camera system 100 as a whole. The body system control unit 117 is realized by using a CPU, for example.

Example 1

Figure 5:
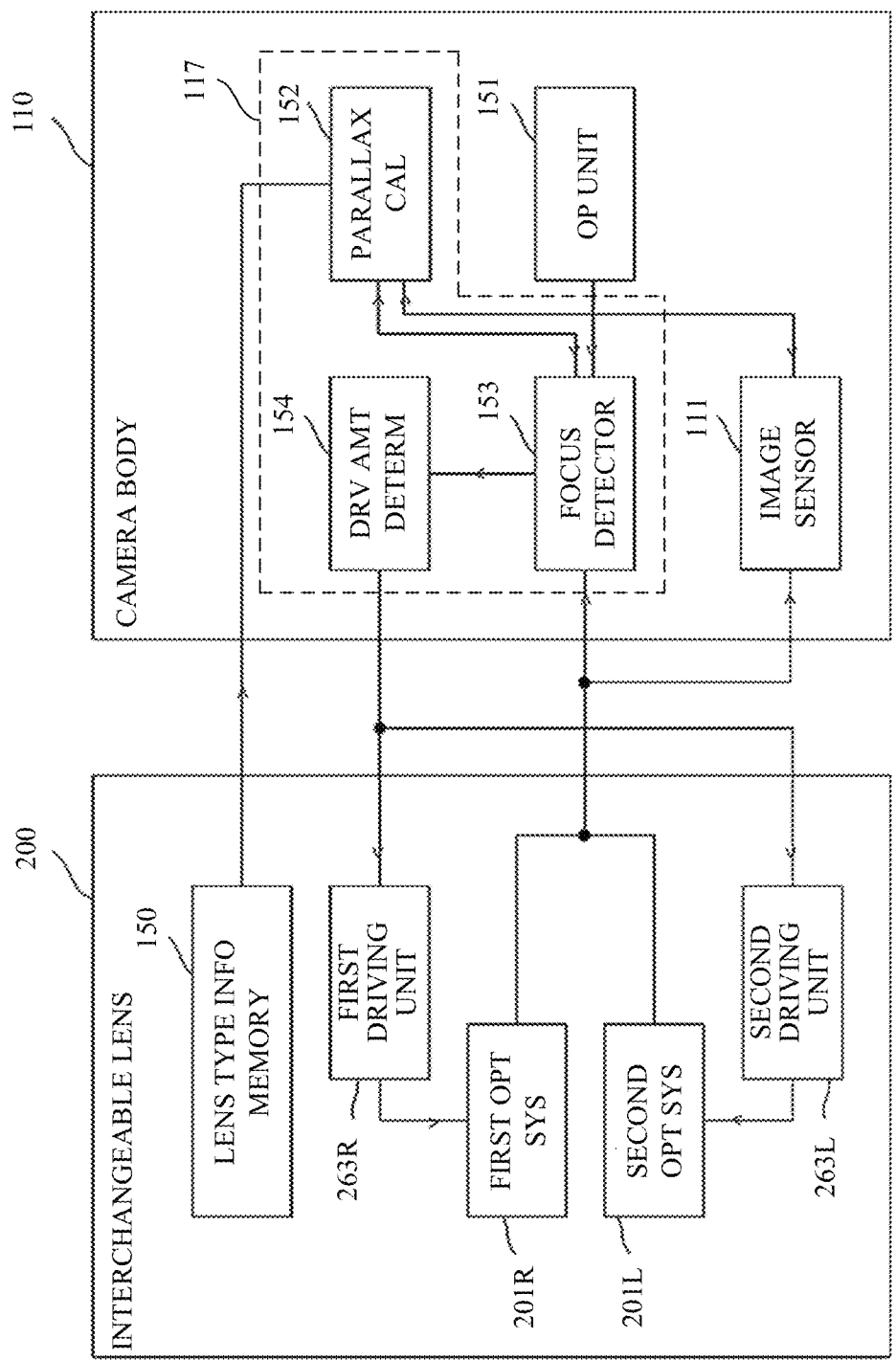
FIG. 5 is a block diagram of the interchangeable lens according to Example 1.

FIG. 5 is a block diagram of a camera system according to this embodiment. The camera system includes the interchangeable lens 200 and the camera body 110. The interchangeable lens 200 includes the first optical system 201R and the second optical system 201L. The interchangeable lens 200 further includes a first driving mechanism 263R (third adjusting unit) that moves the first optical system 201R and a second driving mechanism (fourth adjusting unit) 263L that moves the second optical system 201L. The interchangeable lens 200 includes a lens type information memory 150. Here, the lens type information is configuration information of the optical system, and specifically, information including an identifier indicating whether or not the interchangeable lens 200 is a lens for VR imaging.

The camera body 110 includes the image sensor 111, the operation unit 151, a parallax calculator (determining unit) 152, a focus detector (first acquiring unit, second acquiring unit) 153, and a driving amount determining unit (control unit) 154. The parallax calculator 152, the focus detector 153, and the driving amount determining unit 154 are included in the body system control unit 117 in this embodiment, but this embodiment is not limited to this example. For example, the lens system control unit 209 may has a configuration having functions equivalent to those of the parallax calculator 152, the focus detector 153, and the driving amount determining unit 154. The parallax calculator 152, the focus detector 153, and the driving amount determining unit 154 may be configured as a control apparatus separate from the camera body 110. The image sensor 111 includes a single image sensor, and two images, an image formed via the first optical system 201R and an image formed via the second optical system 201L, are formed on the imaging surface of the image sensor 111. The operation unit 151 is, for example, a touch panel, a joystick, or the like, and is used by the user to select a focus detection position during autofocusing of the camera system. The parallax calculator 152 calculates a parallax amount between the object image formed via the first optical system 201R and the object image formed via the second optical system 201L based on configuration information of the optical system in the lens type information memory 150. The parallax calculator 152 determines a second focus detection position corresponding to the second optical system 201L based on the calculated parallax amount and the first focus detection position corresponding to the first optical system 201R. Here, the first focus detection position and the second focus detection position are imaging positions of the same object. The focus detector 153 acquires a focus detection evaluation value at the focus detection position designated by the operation unit 151 or the parallax calculator 152. The driving amount determining unit 154 determines driving amounts of the first driving mechanism 263R and the second driving mechanism 263L from the focus detection evaluation value acquired by the focus detector 153.

A description will now be given of a focus detection position determination method by the parallax calculator 152 according to this embodiment. In a camera system for VR imaging which includes an interchangeable lens having a plurality of optical systems and an image pickup apparatus having a single image sensor, in a case where the base length L1 is set long so that images with a large stereoscopic effect can be captured, it is conceivable to adopt the bending optical system shown in FIG. 1. At this time, it is necessary to make the distance L2 between the third optical axes shorter than the base length L1 and the diameter of the lens mount unit 202.

The parallax calculator 152 first performs triangulation based on the focal lengths and the base length L1 of the optical systems stored in the lens type information memory 150, and the object distance information acquired by the focus detector 153. Next, the parallax calculator 152 calculates a parallax amount on the imaging surface of the image sensor 111 between the object image formed by the first optical system 201R and the object image formed by the second optical system 201L. In order to calculate the parallax with high accuracy, the lens type information memory 150 may store optical information such as projection methods and distortion coefficients of the first optical system 201R and the second optical system 201L.

The parallax calculator 152 determines the focus detection position corresponding to the second optical system 201L using the following equation (1):

$$(X2, Y2) = (X1 + Xp + L2 + X_E, Y1 + Yp + Y_E) \quad (1)$$

where (X1, Y1) are coordinates on the imaging surface of the image sensor 111 of the focus detection position corresponding to the first optical system 201R. (X2, Y2) are coordinates on the imaging surface of the image sensor 111 of the focus detection position corresponding to the second optical system 201L. (Xp, Yp) is a parallax amount vector of an object on the imaging surface of the image sensor 111. (L2, 0) is a distance vector between the third optical axes. ($X_E$, $Y_E$) is a shift vector from the ideal value of the distance between the third optical axes due to the mount attachment and detachment operations.

Figure 6A:
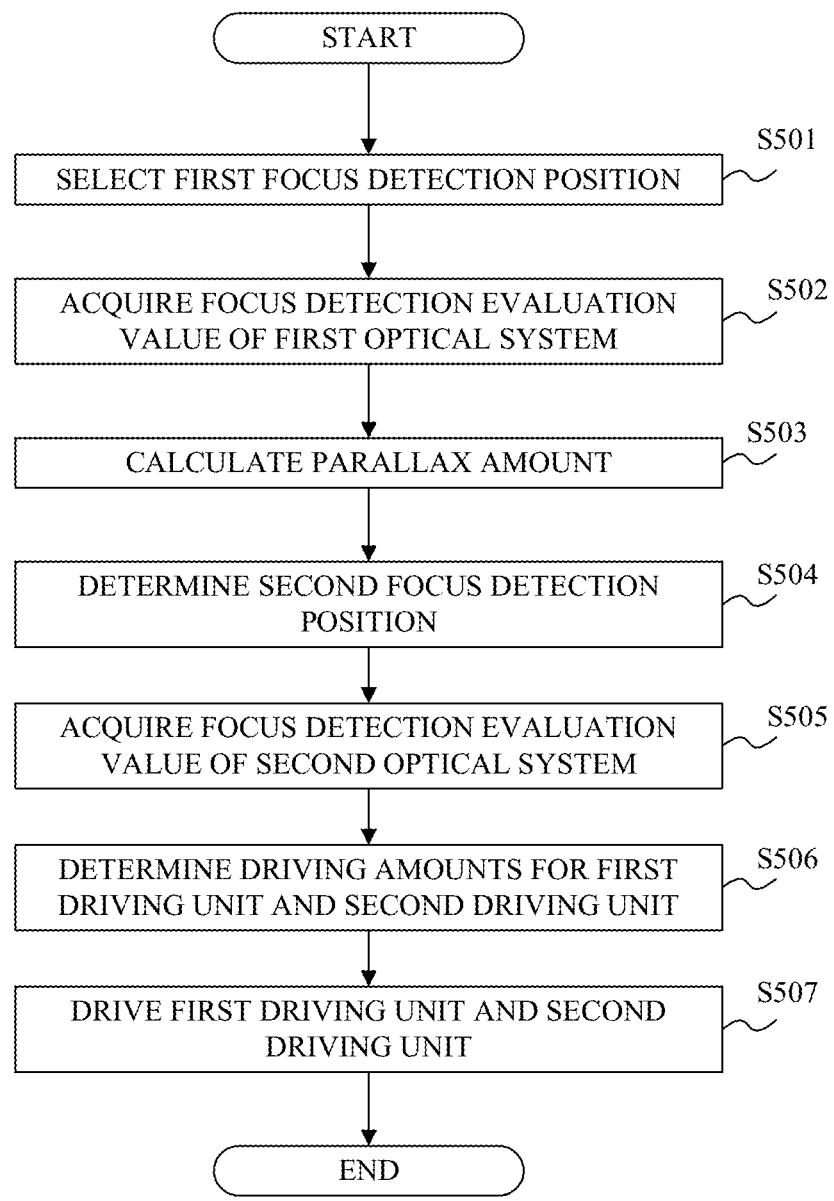
FIG. 6A is an example of a flowchart illustrating a focusing operation of a camera system according to Example 1.
Figure 6B:
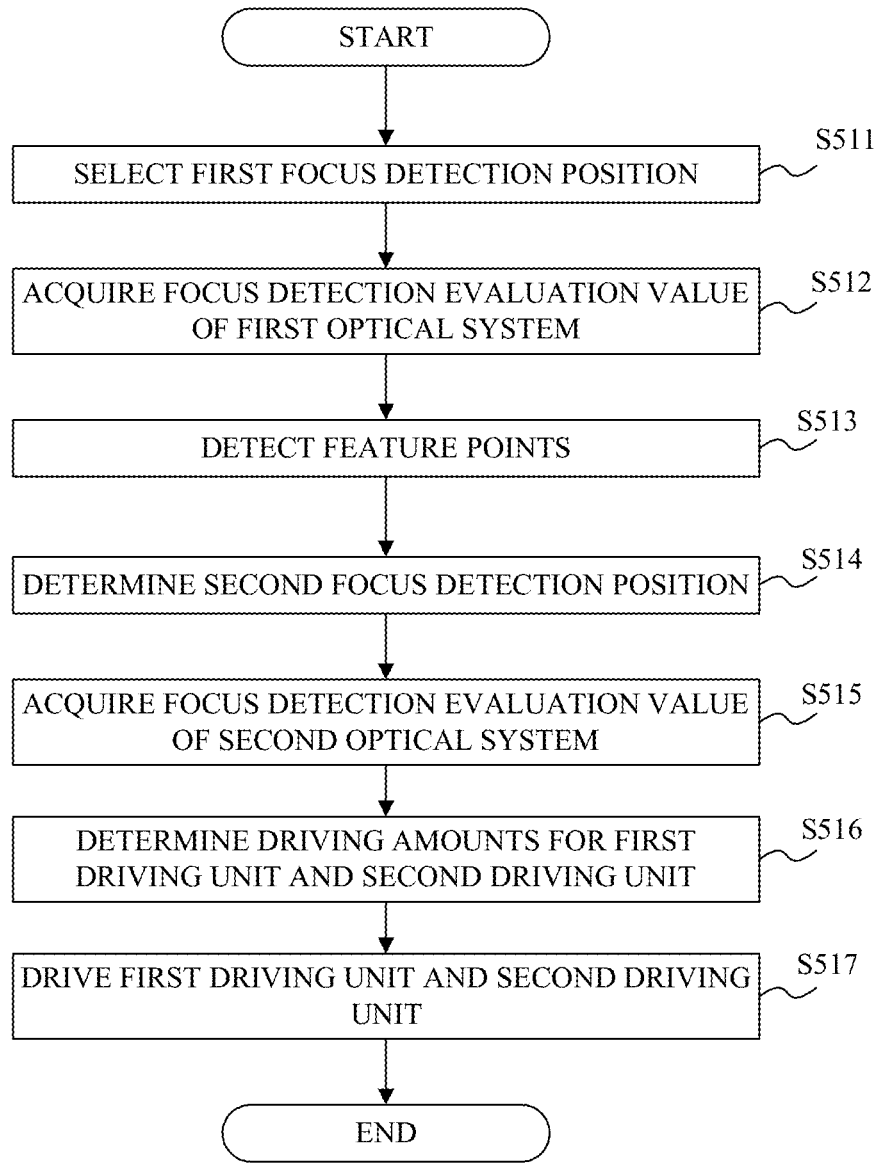
FIG. 6B is another example of a flowchart illustrating a focusing operation of the camera system according to Example 1.

Referring now to FIGS. 6A and 6B, a description will be given of a focusing operation of the camera system of this embodiment. FIG. 6A is an example of a flowchart illustrating the focusing operation of the camera system by the body system control unit 117 according to this embodiment.

In step S501, the user operates the operation unit 151 to select a first focus detection position corresponding to the first optical system 201R.

In step S502, the focus detector 153 acquires a focus detection evaluation value (first evaluation value) of the first optical system 201R at the first focus detection position selected by the user.

In step S503, the parallax calculator 152 calculates a parallax amount based on the focal lengths and base length L1 of optical systems stored in the lens type information memory 150, and the object distance information acquired by the focus detector 153. Here, the parallax amount is a parallax amount between the object image formed by the first optical system 201R and the object image formed by the second optical system 201L, as described above.

In step S504, the parallax calculator 152 determines a second focus detection position corresponding to the second optical system 201L based on the focus detection position of the first optical system 201R, the distance L2 between the third optical axes, and the parallax amount.

In step S505, the focus detector 153 acquires a focus detection evaluation value (second evaluation value) of the second optical system 201L at the determined second focus detection position.

In step S506, the driving amount determining unit 154 determines driving amounts of the first driving mechanism 263R and the second driving mechanism 263L from the focus detection evaluation value of each optical system.

In step S507, the first driving mechanism 263R and the second driving mechanism 263L are driven. Thereby, the focusing operations of the first optical system 201R and the second optical system 201L are performed.

FIG. 6B is another example of a flowchart illustrating the focusing operation of the camera system by the body system control unit 117 according to this embodiment.

In step S511, the user operates the operation unit 151 to select the first focus detection position corresponding to the first optical system 201R.

In step S512, the focus detector 153 acquires the focus detection evaluation value (first evaluation value) of the first optical system 201R at the first focus detection position selected by the user.

In step S513, the parallax calculator 152 detects feature points in each image formed and acquired by the first optical system 201R and the second optical system 201L.

In step S514, the parallax calculator 152 matches feature points pointing to the same object in images formed by different optical systems, and uses the result of feature point matching, and determines the second focus detection position corresponding to the second optical system 201L.

In step S515, the focus detector 153 acquires the focus detection evaluation value (second evaluation value) of the second optical system 201L at the determined second focus detection position.

In step S516, the driving amount determining unit 154 determines the driving amounts of the first driving mechanism 263R and the second driving mechanism 263L from the focus detection evaluation value of each optical system.

In step S517, the first driving mechanism 263R and the second driving mechanism 263L are driven. Thereby, the focusing operations of the first optical system 201R and the second optical system 201L are performed.

Figure 7:
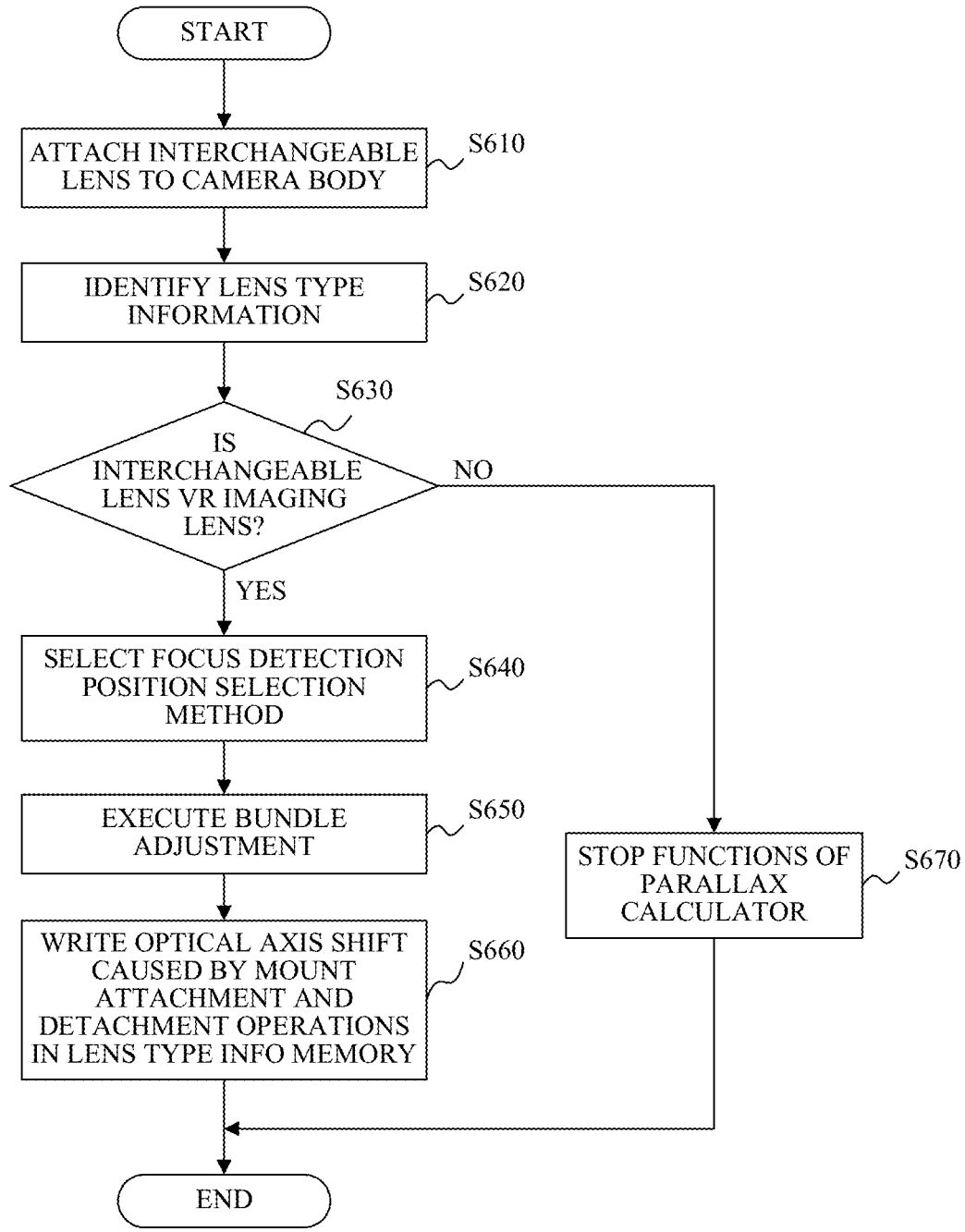
FIG. 7 is a flowchart illustrating an operation of the camera system with the interchangeable lens according to Example 1 attached.

Referring now to FIG. 7, a description will be given of the operation of attaching the interchangeable lens 200 to the camera body 110. FIG. 7 is a flowchart illustrating the operation of the camera system by the body system control unit 117 in a case where the interchangeable lens 200 according to this embodiment is attached.

In step S610, the body system control unit 117 detects that the interchangeable lens 200 is attached to the camera body 110.

In step S620, the parallax calculator 152 identifies the lens type information stored in the lens type information memory 150 of the attached interchangeable lens 200.

In step S630, it is determined using the lens type information whether the attached interchangeable lens 200 is a VR imaging lens. In a case where it is determined that the attached interchangeable lens 200 is a VR imaging lens, the processing of step S640 is executed; otherwise, the processing of step S670 is executed.

In step S640, the parallax calculator 152 selects a focus detection position determination method. In a case where the focus detection position determination method is selected and, for example, the interchangeable lens 200 is a lens for VR180 imaging, the parallax calculator 152 uses equation (1) in this example to determine a focus detection position corresponding to the second optical system 201L.

In step S650, the camera body 110 performs bundle adjustment, for example, and detects an error from the design value and an optical axis shift (misalignment) due to mount attachment and detachment operations.

Figure 8:
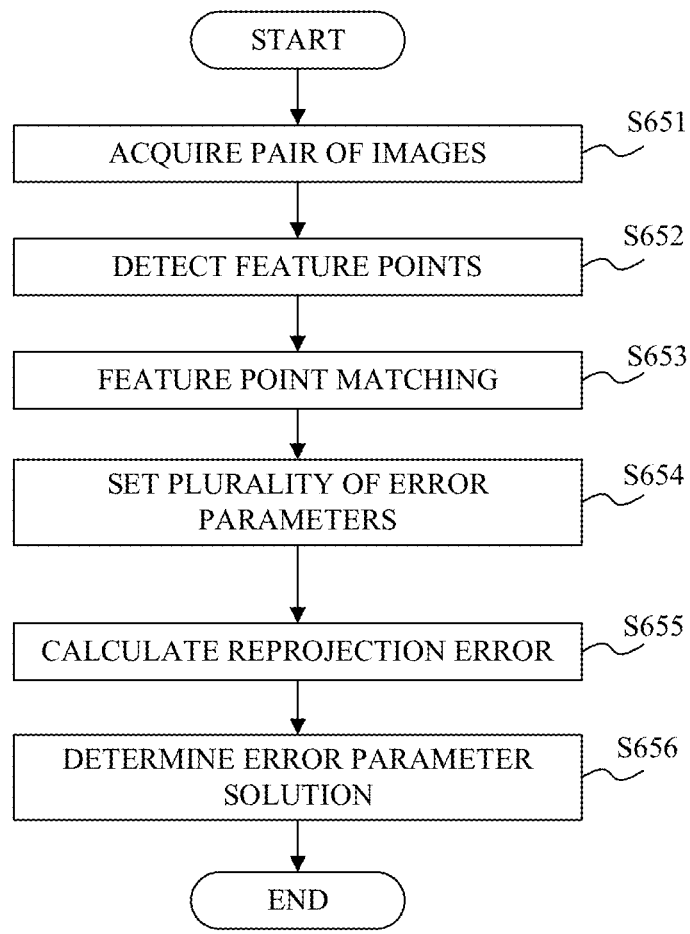
FIG. 8 is a flowchart illustrating a method of bundle adjustment according to Example 1.

FIG. 8 is a flowchart illustrating a bundle adjustment method by the body system control unit 117 according to this embodiment.

In step S651, the image sensor 111 acquires a pair of images formed by the first optical system 201R and the second optical system 201L.

In step S652, the parallax calculator 152 detects feature points in the acquired image.

In step S653, the parallax calculator 152 matches feature points pointing to the same object in images formed by different optical systems, and extracts n feature point pairs.

In step S654, the parallax calculator 152 sets a plurality of error parameters for each optical system. For example, $X_{ER}$ is a horizontal component of the optical axis shift of the first optical system 201R due to the mount attachment and detachment operations, $Y_{ER}$ is a vertical component of the optical axis shift of the first optical system 201R due to the mount attachment and detachment operations, $X_{EL}$ is a horizontal component of the optical axis shift of the second optical system 201L, and $Y_{EL}$ is a vertical component of the optical axis shift of the second optical system 201L. At this time, a plurality of parameter sets P are set in which the components $X_{ER}$, $Y_{ER}$, $X_{EL}$, and $Y_{EL}$ are set slightly differently. That is, the parameter set P is defined as illustrated in equation (2) below:

$$P = \begin{pmatrix} X_{ER} \\ Y_{ER} \\ X_{EL} \\ Y_{EL} \end{pmatrix} \quad (2)$$

In step S655, a reprojection error E for each parameter set P is calculated based on the following equation (3):

$$E = \|p_i - f(q_i, P)\| \quad (3)$$

The projection function f is a function for converting the coordinates of the feature point imaged by the first optical system 201R to the coordinates of the image imaged by the second optical system 201L based on the focal length and base length of the interchangeable lens 200.

In step S656, the parallax calculator 152 performs optimization calculation by the nonlinear least-squares method illustrated in equation (4) below, and determines one error parameter solution $P_{ans} \in P$. A difference between the components $X_{ER}$ and $X_{EL}$ of the solution $P_{ans}$ and a difference between the components $Y_{ER}$ and $Y_{EL}$ of the solution $P_{ans}$ correspond to the shift amount vector $(X_E, Y_E)$ of a distance between the third optical axes from the ideal value due to the mount attachment and detachment operations illustrated in equation (1):

$$P_{ans} = \arg\min_{P} \sum_{i}^{n} \|p_i - f(q_i, P)\|^2 \quad (4)$$

In a case where bundle adjustment is performed, the processing returns to the flow in FIG. 7. In step S660 of FIG. 7, the parallax calculator 152 writes the optical axis shift $P_{ans}$ due to the mount attachment and detachment operations to the lens type information memory 150.

In step S670, the parallax calculator 152 stops functioning.

The method of calculating the optical axis shift $P_{ans}$ due to the mount attachment and detachment operations for bundle adjustment is not limited to the method described in this example. For example, a sensor that calculates the optical axis shift $P_{ans}$ may be mounted. The interchangeable lens 200 may include a calculator for the optical axis shift $P_{ans}$.

Example 2

Figure 9:
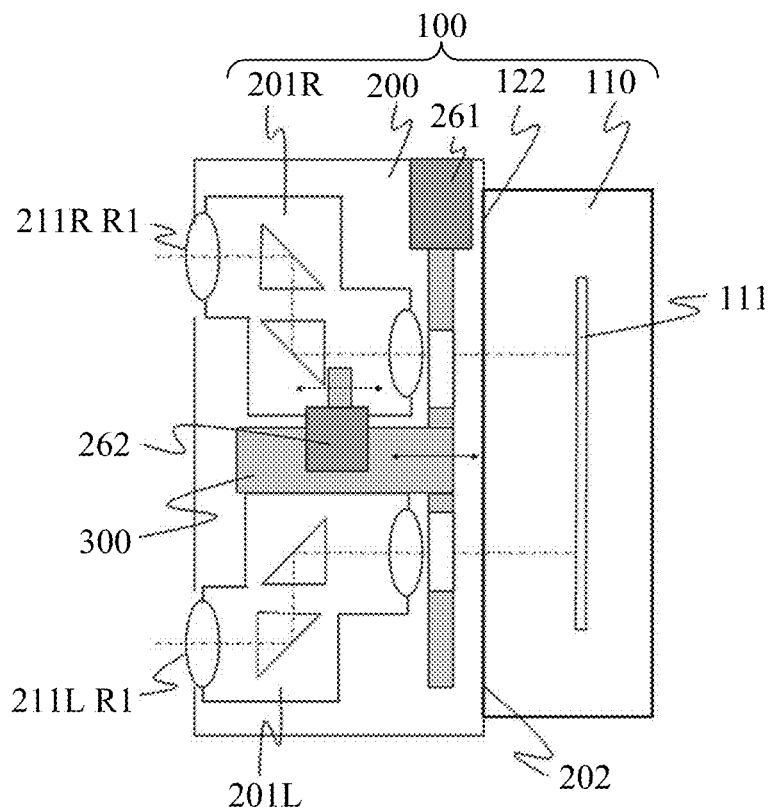
FIG. 9 is a schematic configuration diagram of a camera system according to Example 2.

FIG. 9 is a schematic configuration diagram of the camera system 100 according to this example. This example will discuss only configurations different from that of Example 1, and omit a description of common configurations.

The image sensor 111 can perform image-plane phase-difference AF by detecting a focus shift amount and focus shift direction. The interchangeable lens 200 includes a driving mechanism (first adjusting unit) 261 configured to move the lens top base 300 and a driving mechanism (second adjusting unit) 262 that is provided on the lens top base 300 and moves the first optical system 201R. The driving mechanism 261 can move the first optical system 201R and the second optical system 201L in a direction orthogonal to the imaging surface of the image sensor 111 by moving the lens top base 300.

The second optical system 201L is fixed to the lens top base 300. The first optical system 201R is supported by the lens top base 300 so as to be movable in the direction orthogonal to the imaging surface of the image sensor 111 relative to the lens top base 300 by the driving mechanism 262. Thereby, the first optical system 201R and the second optical system 201L can move relative to each other in the direction orthogonal to the imaging surface of the image sensor 111. In this example, each of the first optical system 201R and the second optical system 201L includes a lens unit in which an imaging optical system is integrated, and focusing can be performed by extending the entire optical system. This example entirely extends the two optical systems, and can reduce a characteristic difference between the two optical systems. In this example, the first optical system 201R is a first focus lens optical system, and the second optical system 201L is a second focus lens optical system. The second optical system 201L may be the first focus lens optical system, and the first optical system 201R may be the second focus lens optical system.

Figure 10:
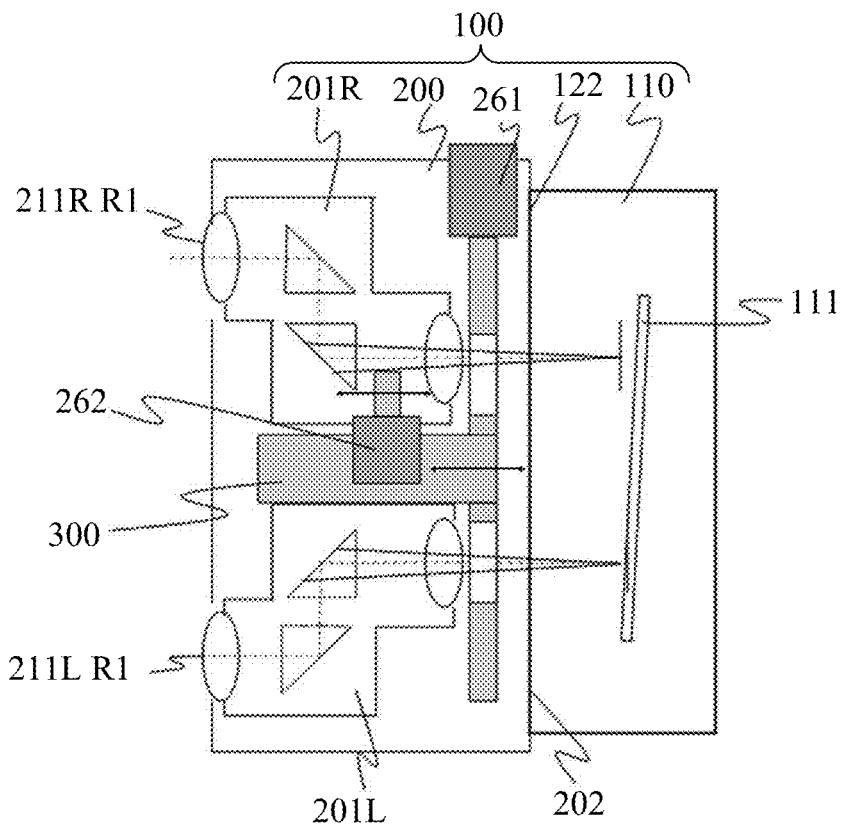
FIG. 10 is a schematic configuration diagram illustrating a tilted image sensor.

The image sensor 111 is installed so that its imaging surface is parallel to the lens mount unit 202. However, it is difficult to make the imaging surface perfectly parallel to the lens mount unit 202 due to manufacturing errors, and the image sensor 111 is actually fixed with its imaging surface slightly tilted relative to the lens mount unit 202. FIG. 10 is a schematic configuration diagram illustrating the tilted image sensor 111. The manufacturing process adjusts the interchangeable lens 200 so that a distance between the imaging position of the first optical system 201R and the imaging position of the second optical system 201L from the lens mount unit 202, that is, a difference between the so-called flange back distances becomes 0. However, due to the tilt of the image sensor 111, the two optical systems do not always have the best in-focus position. Accordingly, this example configures the two optical systems movable in the direction orthogonal to the imaging surface by the driving mechanism 262, and thereby adjusts the focal positions of the two optical systems.

Figure 11A:
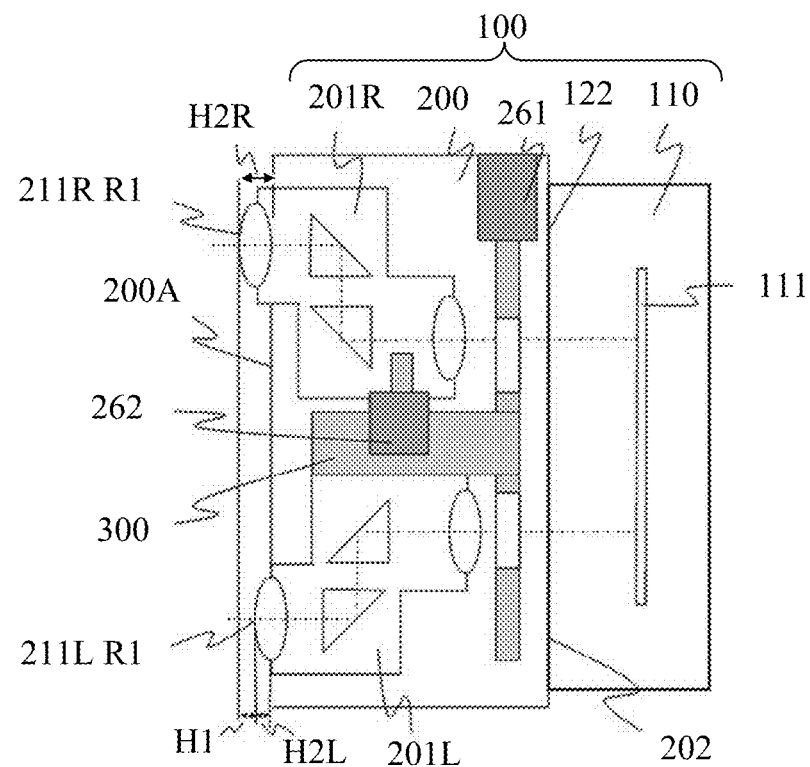
FIGS. 11A, 11B, and 11C illustrate an example of a focusing operation procedure according to Example 2.
Figure 11B:
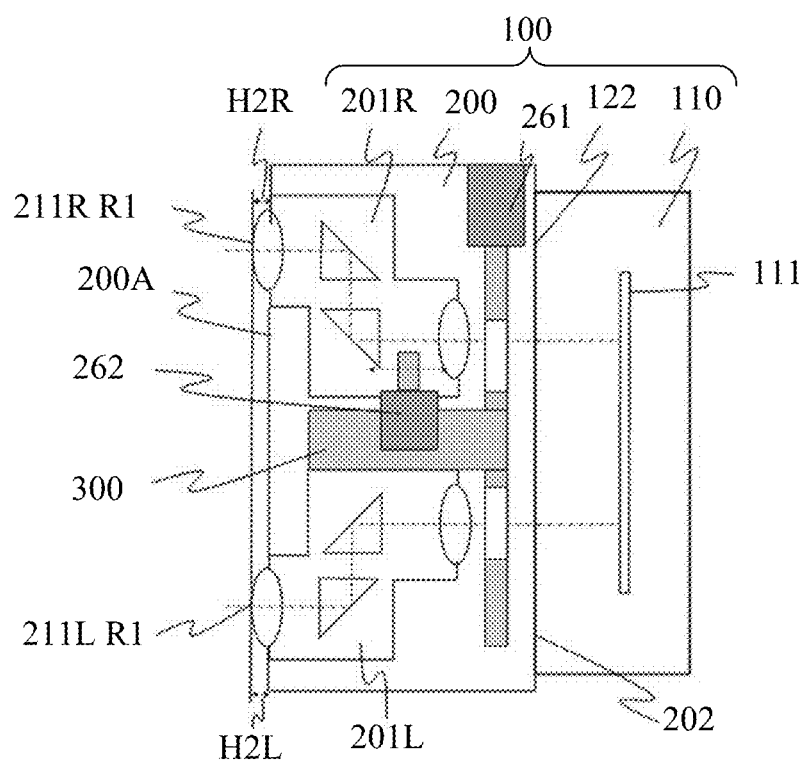
Figure 11C:
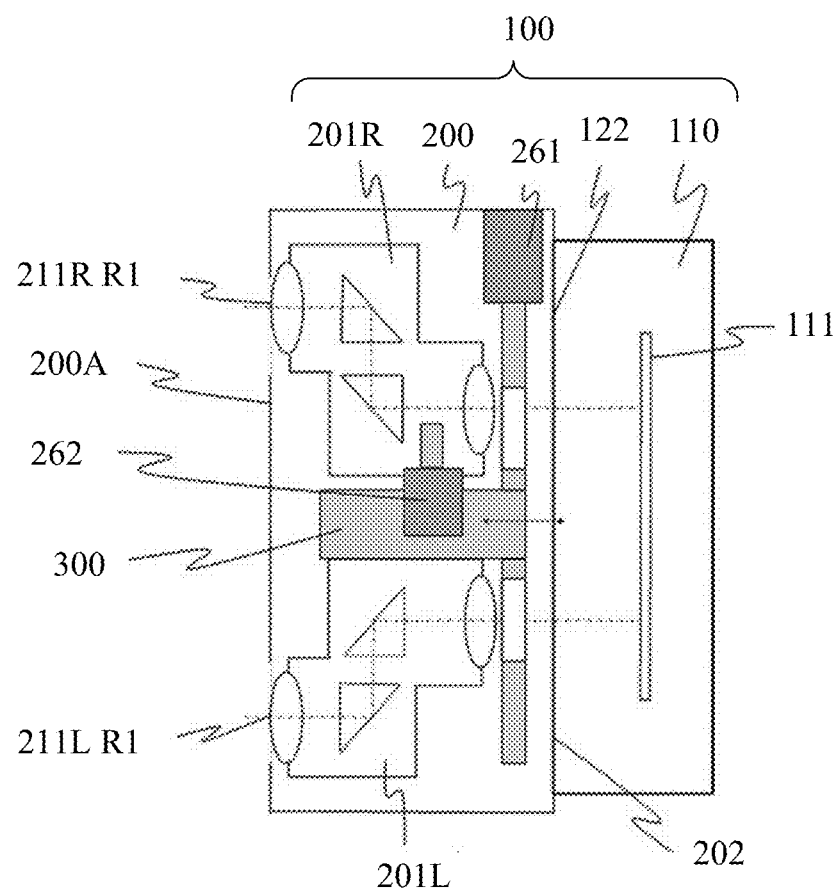

Referring now to FIGS. 11A, 11B, and 11C, a description will be given of the focusing operation procedure according to this example. FIGS. 11A, 11B, and 11C illustrate the focusing operation procedure according to this example.

FIG. 11A illustrates the camera system 100 before focusing. Assume that a focus difference (left-right focus difference) H1 between the two optical systems can be simply expressed by a difference between an R1 surface of the first lens 211R disposed in the first optical system 201R and an R1 surface of the first lens 211L disposed in the second optical system 201L. A focus shift amount is defined as a difference between the R1 surface of the first lens 211R(L) and a line 200A provided on the interchangeable lens 200, and a focus shift amount of the first optical system 201R can be simply represented by H2R, a focus shift amount of the second optical system 201L can be simply represented by H2L. The in-focus state is achieved in a case where the R1 surface of the first lens unit 211R(L) and the line 200A provided on the interchangeable lens 200 overlap each other, that is, in a case where the focus shift amounts H2R and H2L become zero.

In a case where the user presses the release button, the focus detector 153 acquires two evaluation values (moving amount and moving direction) corresponding to the two optical systems, and determines the focus shift amount. In a case where the focus detection position of one of the two optical systems is determined based on the user's input, the focus detection position of the other of the two optical systems is determined according to the focus detection position determination method selected by the parallax calculator 152. Based on the evaluation values obtained at the determined focus detection positions, it is confirmed whether the difference between the two evaluation values (left-right focus difference H1) is within the permissible range (predetermined value).

In this example, since the left-right focus difference H1 is not within the permissible range, the first optical system 201R is moved using the driving mechanism 262 so that the left-right focus difference H1 becomes within the permissible range. FIG. 11B illustrates the R1 surfaces of the first lenses 211R and 211L on the same plane, and illustrates that the left-right focus difference H1 is controlled to be within the permissible range. Thereafter, as illustrated in FIG. 11C, the driving mechanism 261 simultaneously moves the two optical systems so that the focus shift amounts H2R and H2L are within the permissible range.

In this example, the driving mechanism 261 is driven after the driving mechanism 262 is driven.

Figure 12A:
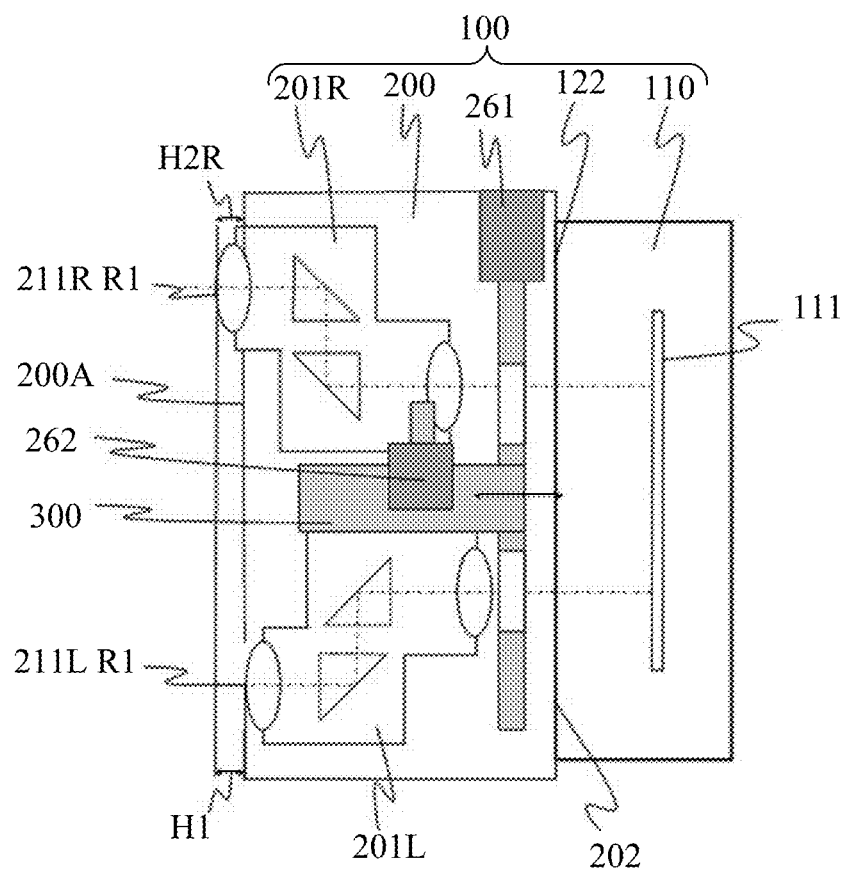
FIGS. 12A and 12B illustrate another example of the focusing operation procedure according to Example 2.
Figure 12B:
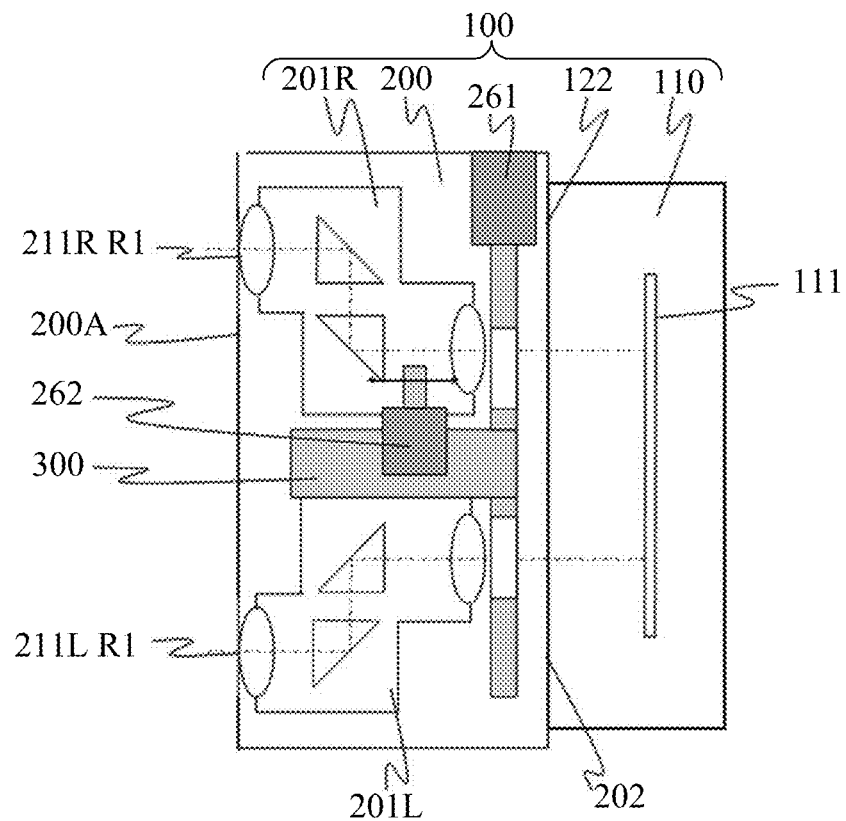

As illustrated in FIG. 12A, first, the driving mechanism 261 may be driven so that the focus shift amount H2L of the second optical system 201L is within the permissible range. Thereafter, as illustrated in FIG. 12B, the driving mechanism 262 may be driven so that the focus shift amount H2R of the first optical system 201R is within the permissible range.

Figure 13A:
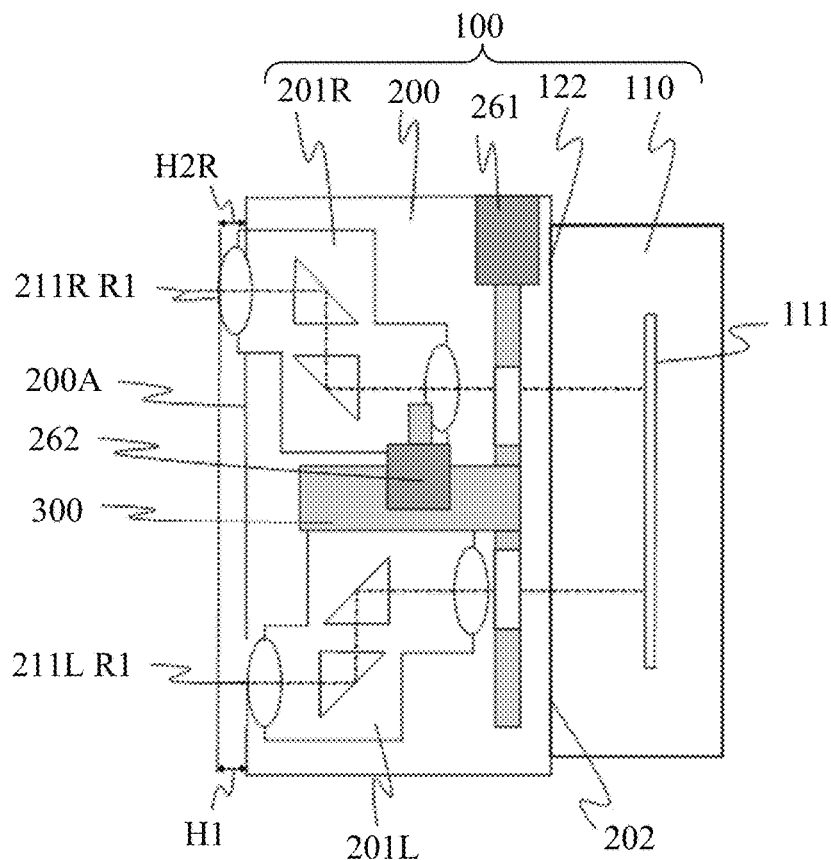
FIGS. 13A and 13B illustrate another example of the focusing operation procedure of Example 2.
Figure 13B:
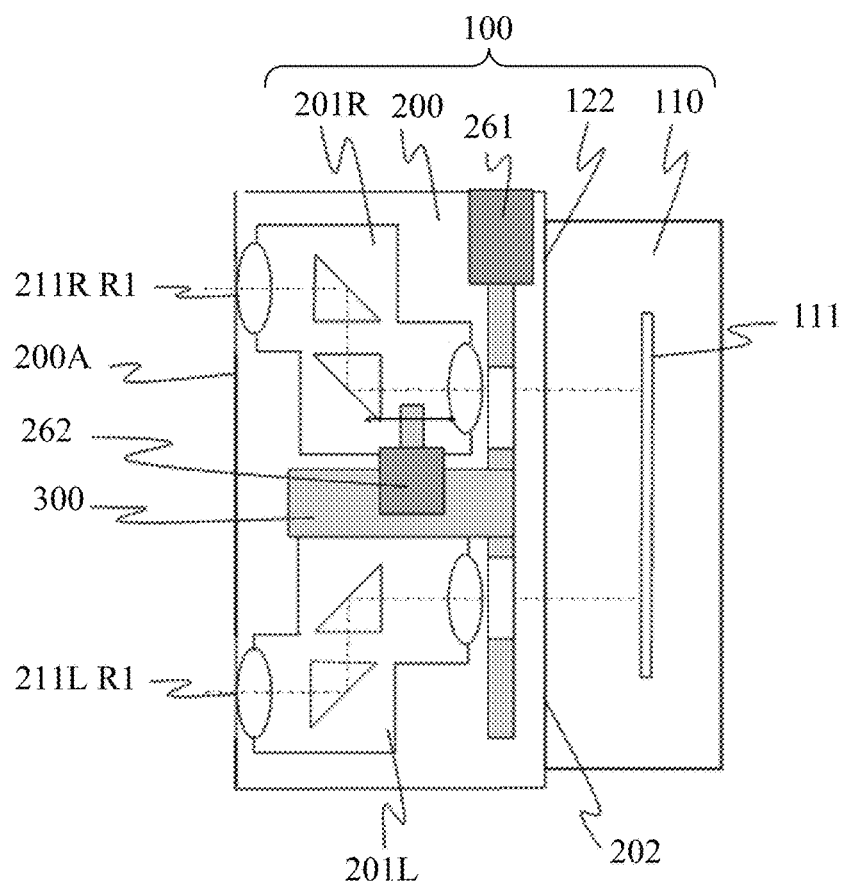

Referring now to FIGS. 13A and 13B, a description will be given of a focusing operation procedure in a case where the focus shift amount H2L of the second optical system 201L is within the permissible range and the focus shift amount H2R of the first optical system 201R and the left-right focus difference H1 are substantially equal.

FIG. 13A illustrates the camera system 100 before focusing. In a case where the user presses the release button, the focus detector 153 acquires two evaluation values (moving amount and moving direction) corresponding to the two optical systems, and determines the focus shift amounts. Next, it is confirmed whether a difference between the two evaluation values (left-right focus difference H1) is within the permissible range.

In this example, the left-right focus difference H1 is not within the permissible range, the first optical system 201R is moved using the driving mechanism 262 so that the left-right focus difference H1 is within the permissible range. The focus shift amount H2L of the second optical system 201L is originally within the permissible range, and as illustrated in FIG. 13B, the focus shift amount H2R of the first optical system 201R becomes also within the permissible range and the in-focus states are acquired.

Referring now to 14A and 14B, a description will be given of a focusing operation procedure in a case where the left-right focus difference H1 is within the permissible range and the focus shift amount H2R of the first optical system 201R and the focus shift amount H2L of the second optical system 201L are equal.

Figure 14A:
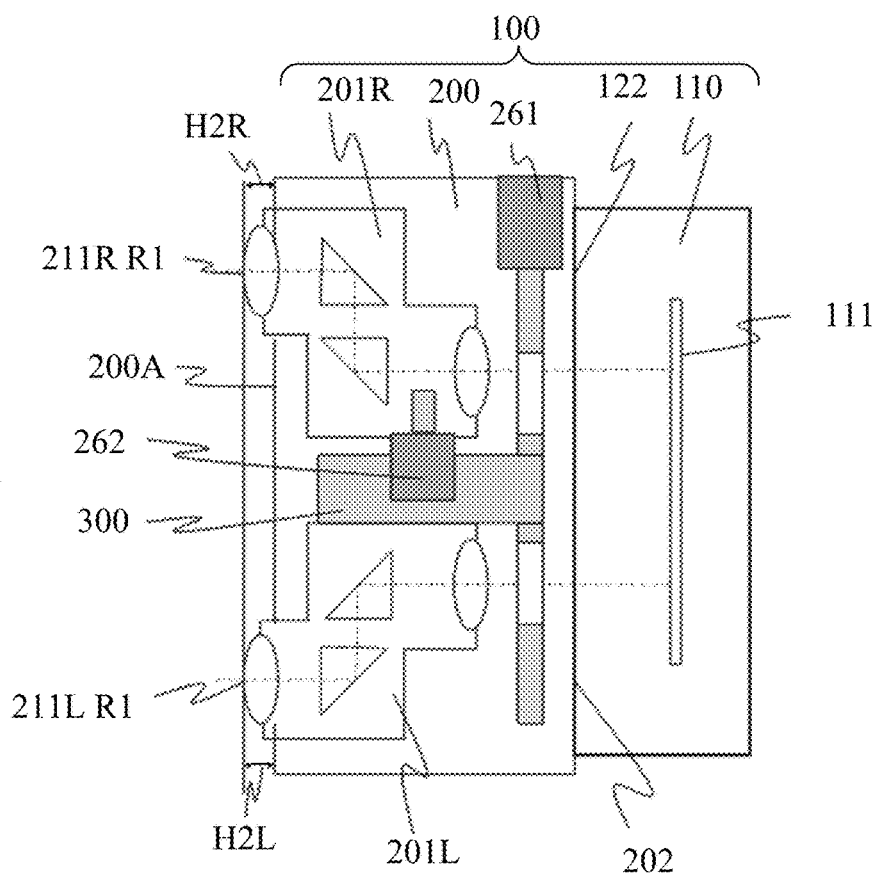
FIGS. 14A and 14B illustrate other examples of focusing operation procedures according to Examples 2 and 3.
Figure 14B:
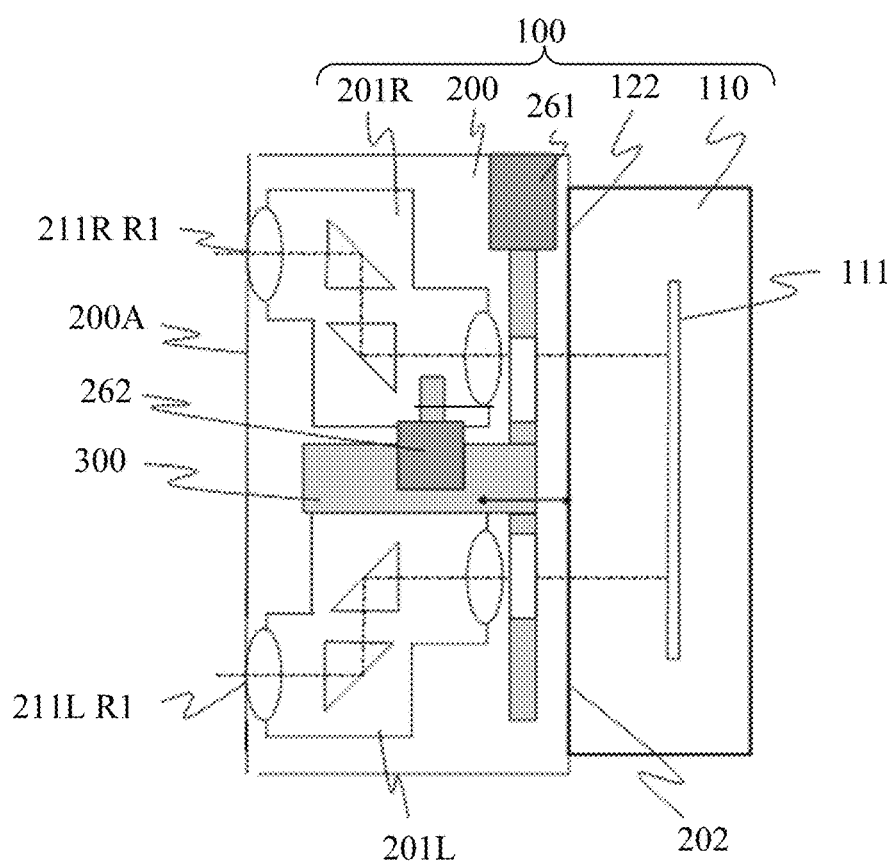

FIG. 14A illustrates the camera system 100 before focusing. In a case where the user presses the release button, the focus detector 153 acquires two evaluation values (moving amount and moving direction) corresponding to the two optical systems, and determines the focus shift amounts. Next, it is confirmed whether a difference between the two evaluation values (left-right focus difference H1) is within the permissible range. In this example, since the left-right focus difference H1 is within the permissible range, as illustrated in FIG. 14B, the driving mechanism 261 simultaneously moves the two optical systems so that the focus shift amounts of the two optical systems are within the permissible ranges.

Example 3

Another example will be described. The basic mechanical configuration or the like are the same as that of FIG. 14 according to Example 2 described above, and this example will discuss only the configuration different from that of Example 2, and will omit a description of the common configuration.

In order to simplify the operation, in this example, assume that focus shift amounts of the two optical systems are adjusted in advance by any method so that they are substantially the same. In that case, it is unnecessary to determine a second focus detection position and to acquire a corresponding evaluation value (moving amount and moving direction) that is the focus shift amount H2L of the second optical system, and thus the operation flow of the camera system 100 becomes simple.

That is, before imaging, adjustment is performed through manual operation so that the left-right focus difference H1 between the first optical system 201R and the second optical system 201L is within the permissible range. This adjustment can perform subsequent imaging without worrying about the left-right focus difference H1 between the first optical system 201R and the second optical system 201L. Sending an operation signal from the outside to the driving mechanism 262 to move only the first optical system 201R can adjust the focus difference H1 between the two optical systems 201R and 201L to be within the permissible range.

The driving mechanism 262 includes a stepping motor, gears, etc., and can be operated by an operation signal generated by a detector that detects the operation amount in a case where the user operates an operation ring of the camera, etc. Thereafter, an imaging operation is performed.

In a case where the user presses the release button, the focus detector 153 acquires only one evaluation value (moving amount and moving direction) corresponding to the first optical system 201R and the focus shift amount H2R. Based on the focus shift amount H2R, the driving mechanism 261 is driven so that the focus shift amount H2R of the first optical system is within the permissible range. By driving the driving mechanism 261, the first optical system 201R and the second optical system 201L are moved in the same direction by the same moving amount, and the two optical systems can become in in-focus states simultaneously.

Example 4

Another example will be described. The basic mechanical configuration or the like is the same as that of Example 2 or 3 described above, so this example will discuss only the configuration different from that of Example 2 or 3, and will omit a description of the common configuration.

Figure 21A:
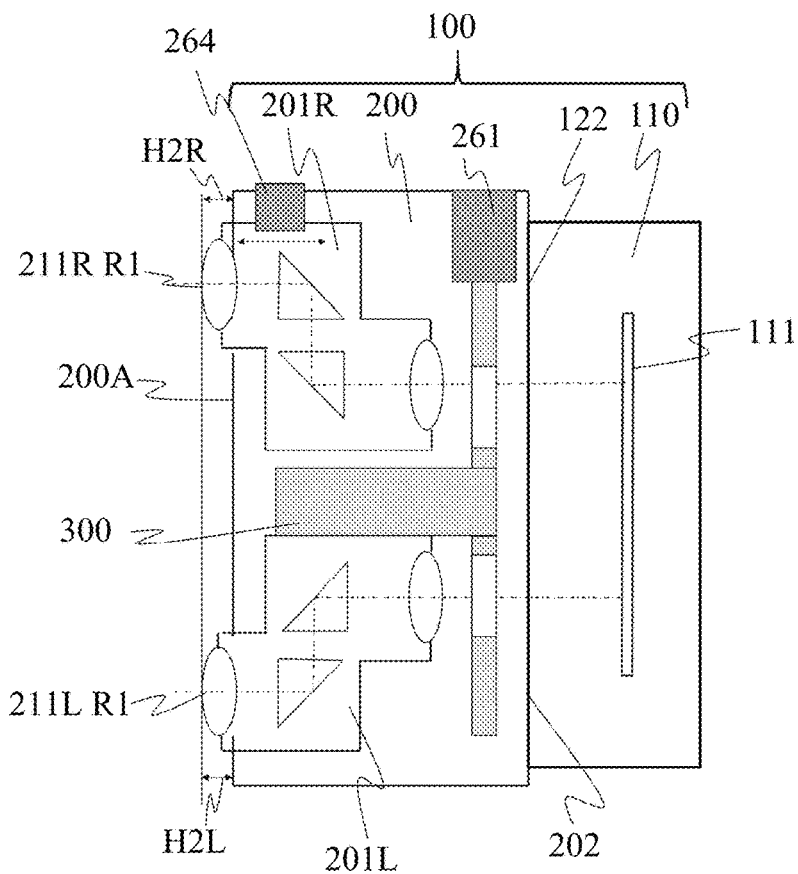
FIGS. 21A and 21B are schematic configuration diagrams of the camera system according to Example 4.

FIG. 21A illustrates another configuration that can previously adjusted the left-right focus difference H1 between the first optical system 201R and the second optical system 201L to be within the permissible range through manual operation. An adjusting mechanism 264 can move the first optical system 201R in the optical axis direction. The adjusting mechanism 264 includes an unillustrated eccentric roller and the like, and is configured to be able to rotate the eccentric roller from the outer circumferential portion of the interchangeable lens 200 with a hexagon wrench or the like. By this operation, only the first optical system 201R can be moved, and the focus difference H1 between the two optical systems 201R and 201L can be adjusted to be within the permissible range. Thereafter, an imaging operation is performed.

Figure 21B:
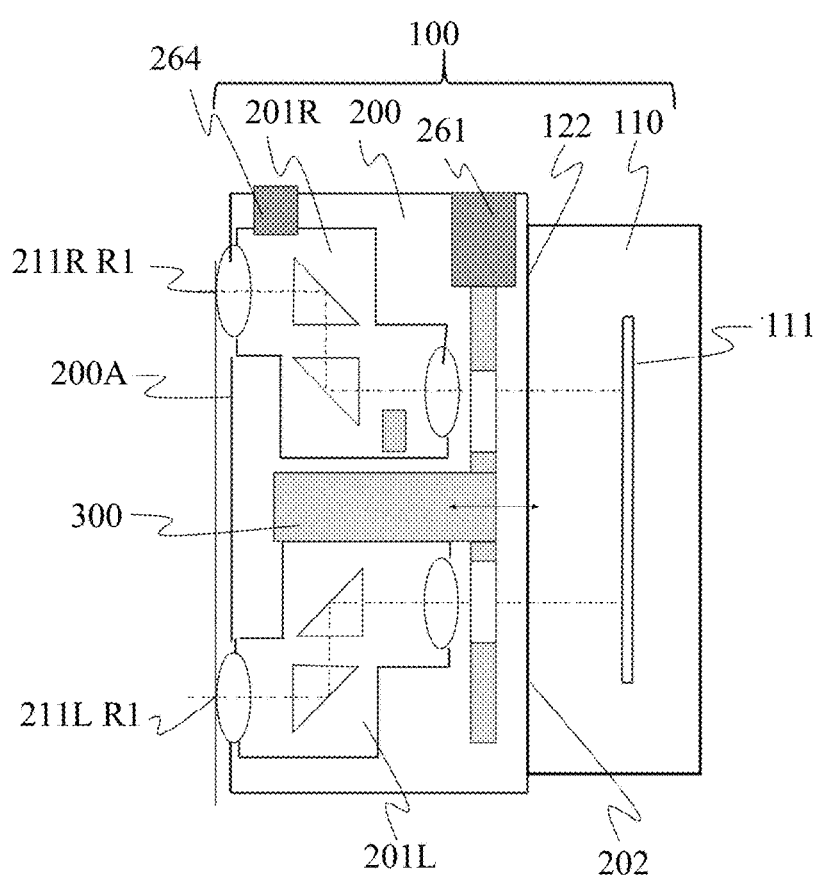

In a case where the user presses the release button, the focus detector 153 acquires only one evaluation value (moving amount and moving direction) corresponding to the first optical system 201R and the focus shift amount H2R. Based on the focus shift amount H2R, the driving mechanism 261 is driven so that the focus shift amount H2R of the first optical system is within the permissible range (FIG. 21B). By driving the driving mechanism 261, the first optical system 201R and the second optical system 201L are moved in the same direction by the same moving amount, and the two optical systems can become in in-focus states simultaneously.

Example 5

Figure 15:
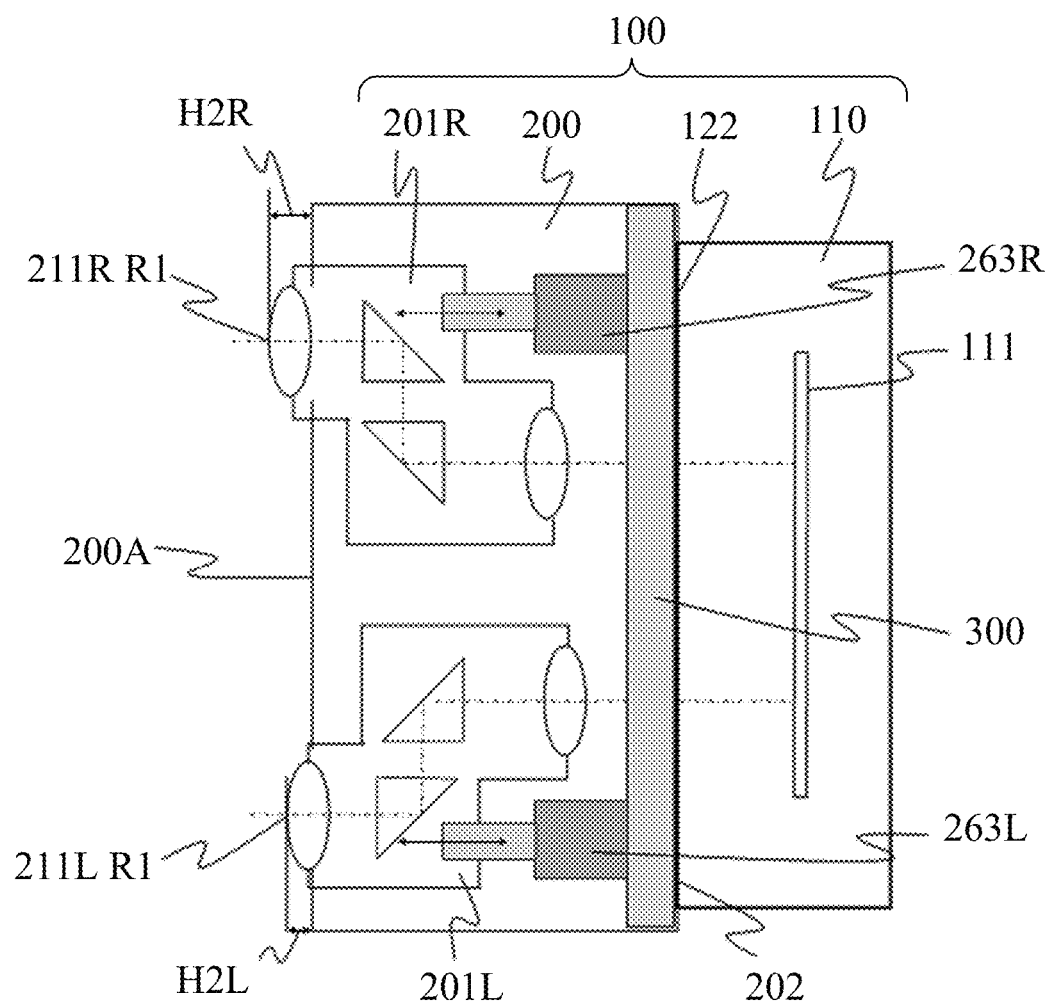
FIG. 15 is a schematic configuration diagram of a camera system according to Example 5.

FIG. 15 is a schematic configuration diagram of the camera system 100 according to this example. This example will discuss only configurations different from those of Examples 1 to 4, and will omit a description of common configurations.

The interchangeable lens 200 includes a first driving mechanism 263R and a second driving mechanism 263L. The first driving mechanism 263R and the second driving mechanism 263L are attached to the lens top base 300. That is, the first driving mechanism 263R and the second driving mechanism 263L are disposed on the same member. The first driving mechanism 263R moves the first optical system 201R relative to the lens top base 300 in the direction orthogonal to the imaging surface of the image sensor 111. The second driving mechanism 263L moves the second optical system 201L relative to the lens top base 300 in the direction orthogonal to the imaging surface of the image sensor 111. Thereby, the first optical system 201R and the second optical system 201L can move relative to each other in the direction orthogonal to the imaging surface of the image sensor 111.

In this example, each of the first optical system 201R and the second optical system 201L includes a lens unit in which an imaging optical system is integrated, and focusing can be performed by extending the entire optical system. This example performs focusing by extending the entire optical system, but may perform focusing by partially extending the optical system or by an inner focus type configuration.

Figure 16A:
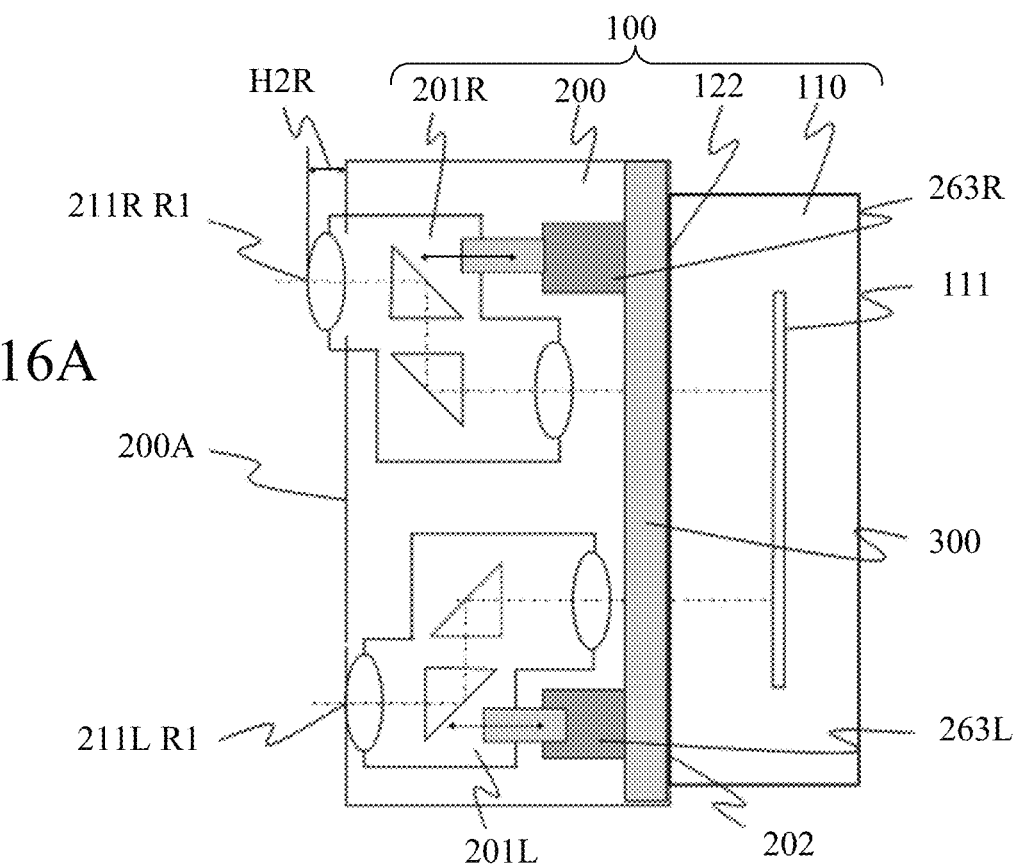
FIGS. 16A and 16B illustrate a focusing operation procedure according to Example 5.
Figure 16B:
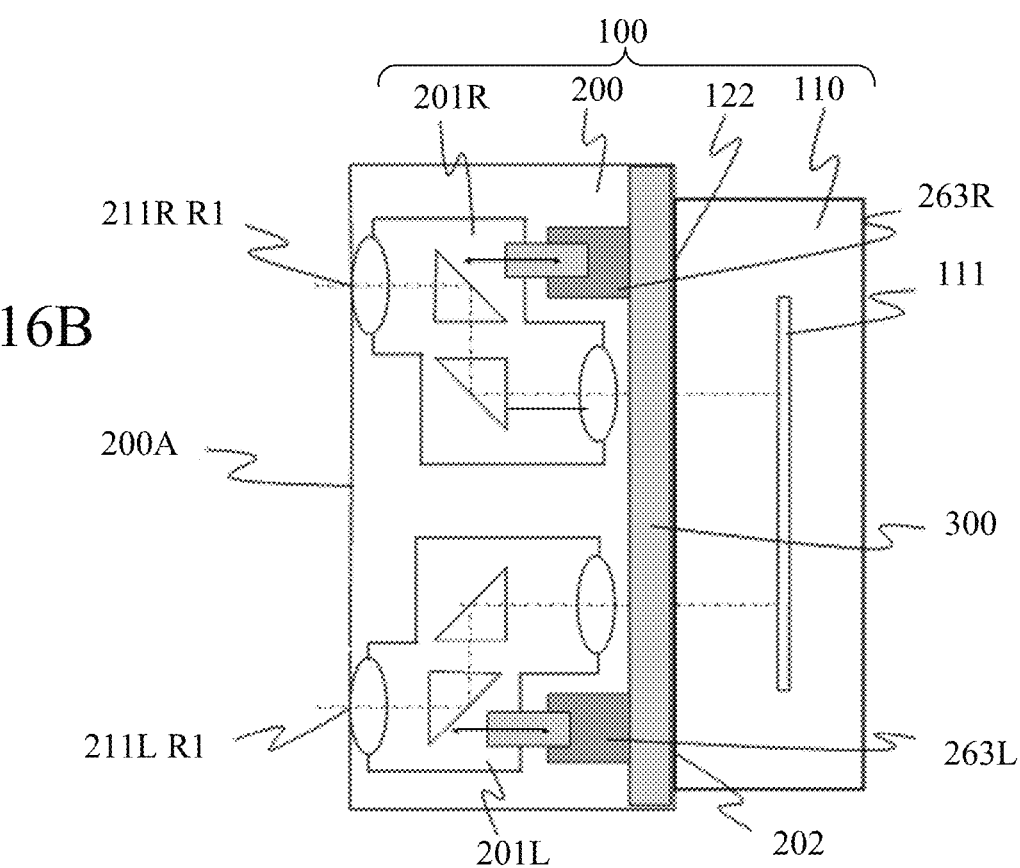

Referring now to FIGS. 16A and 16B, a description will be given of a focusing operation procedure according to this example. FIGS. 16A and 16B illustrate the focusing operation procedure according to this example.

In a case where the user presses the release button, the focus detector 153 acquires two evaluation values (moving amount and moving direction) corresponding to the two optical systems, and determines the focus shift amounts. Next, it is determined whether the difference between the two evaluation values (left-right focus difference H1) is within the permissible range (predetermined range).

Next, as illustrated in FIG. 16A, the second driving mechanism 263L moves the second optical system 201L so that the focus shift amount H2L is within the permissible range. Thereafter, as illustrated in FIG. 16B, the first driving mechanism 263R moves the first optical system 201R so that the focus shift amount H2R is within the permissible range.

This example drives the first driving mechanism 263R, after driving the second driving mechanism 263L. However, this embodiment may drive the second driving mechanism 263L after driving the first driving mechanism 263R. Without any problems of power limitation, the first driving mechanism 263R and the second driving mechanism 263L may be driven simultaneously.

Another example will be described. In order to simplify the operation, assume that focus shift amounts of the two optical systems have been previously adjusted by any method so that they are approximately the same. In that case, it is unnecessary to determine the second focus detection position and to acquire the corresponding evaluation value (moving amount and moving direction) that is the focus shift amount H2L of the second optical system, and the operation flow of the camera system 100 becomes simple.

The method for the user to adjust the focus difference H1 between the two optical systems 201R and 201L to be within the permissible range is as described above, and can be selected from various configurations. Thereafter, an imaging operation is performed.

In a case where the user presses the release button, the focus detector 153 acquires only one evaluation value (moving amount and moving direction) corresponding to the first optical system 201R and the focus shift amount H2R. Based on the focus shift amount H2R, the driving mechanism 263R is driven so that the focus shift amount H2R of the first optical system is within the permissible range. Thereafter, by driving the driving mechanism 263L, the second optical system 201L is moved in the same direction by the same moving amount. Without any problems of power limitation, the first driving mechanism 263R and the second driving mechanism 263L may be simultaneously driven. Since the evaluation value (moving amount and moving direction), which is the focus shift amount H2L of the second optical system, is not used, the operation flow becomes simple.

Example 6

Figure 17:
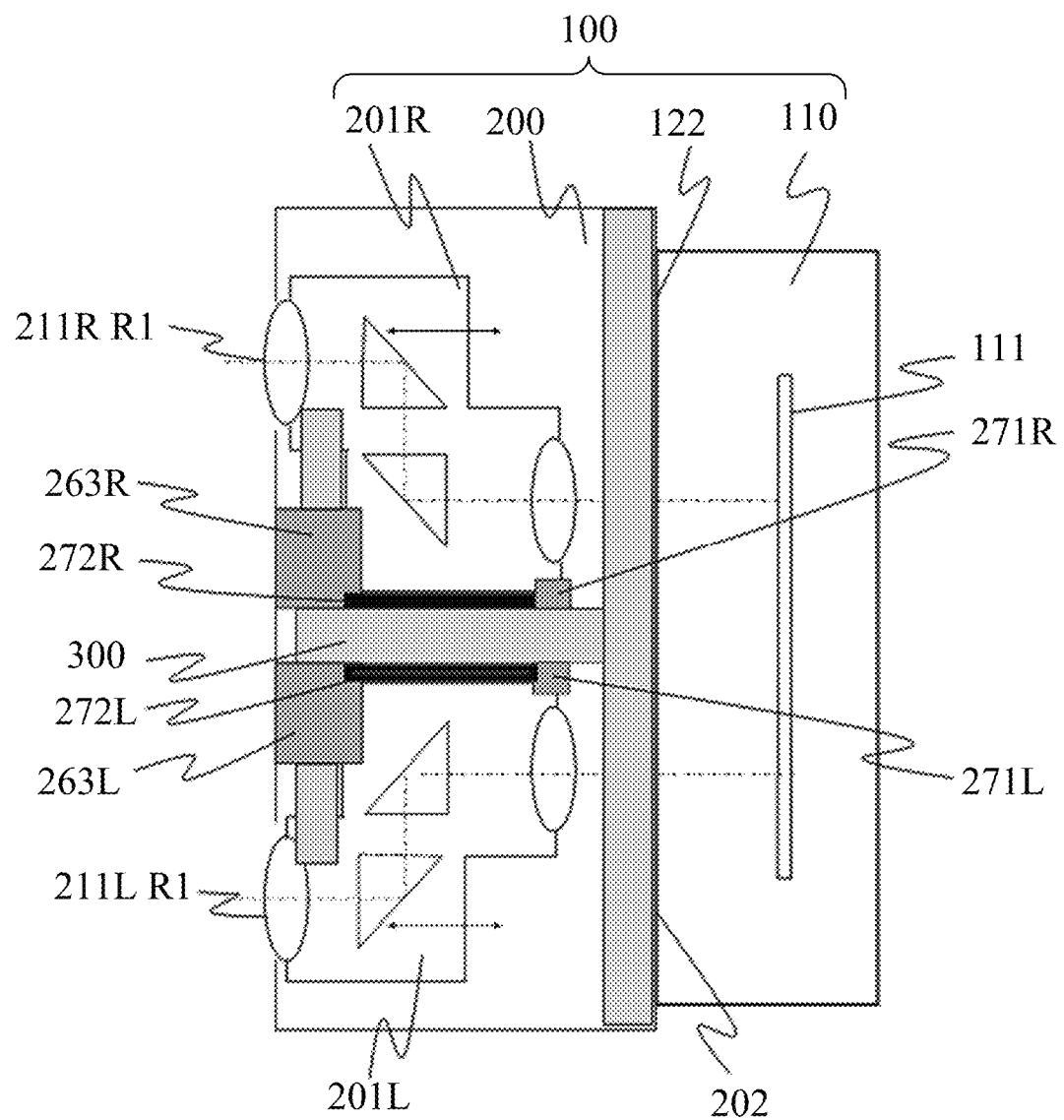
FIG. 17 is a schematic configuration diagram of a camera system according to Example 6.

FIG. 17 is a schematic configuration diagram of a camera system 100 according to this example. The basic configuration of the camera system 100 according to this example is the same as that of each of the above examples. This example will discuss only the configuration different from that of each of the above examples, and will omit a description of the common configuration.

The interchangeable lens 200 includes a position detection sensor (first detector) 271R configured to detect the position of the first optical system 201R and a position detection sensor (second detector) 271L configured to detect the position of the second optical system 201L. The interchangeable lens 200 further includes a guide portion (first guide portion) 272R configured to guide the first optical system 201R and a guide portion (second guide portion) 272L configured to guide the first optical system 201R.

The first driving mechanism 263R and the second driving mechanism 263L are mounted on the lens top base 300 so as to be point-symmetrical with respect to the center of the lens mount unit 202 (the center of the interchangeable lens 200) in a case where the interchangeable lens 200 is viewed from the object side. The first driving mechanism 263R and the second driving mechanism 263L are disposed in opposite directions.

The position detection sensors 271R and 271L are also attached to the lens top base 300. The attachment to the lens top base 300 can detect the position detection sensors 271R and 271L with high accuracy. The guide portions 272R and 272L are also attached to the lens top base 300, respectively, and guide the first optical system 201R and the second optical system 201L.

Example 7

Figure 18:
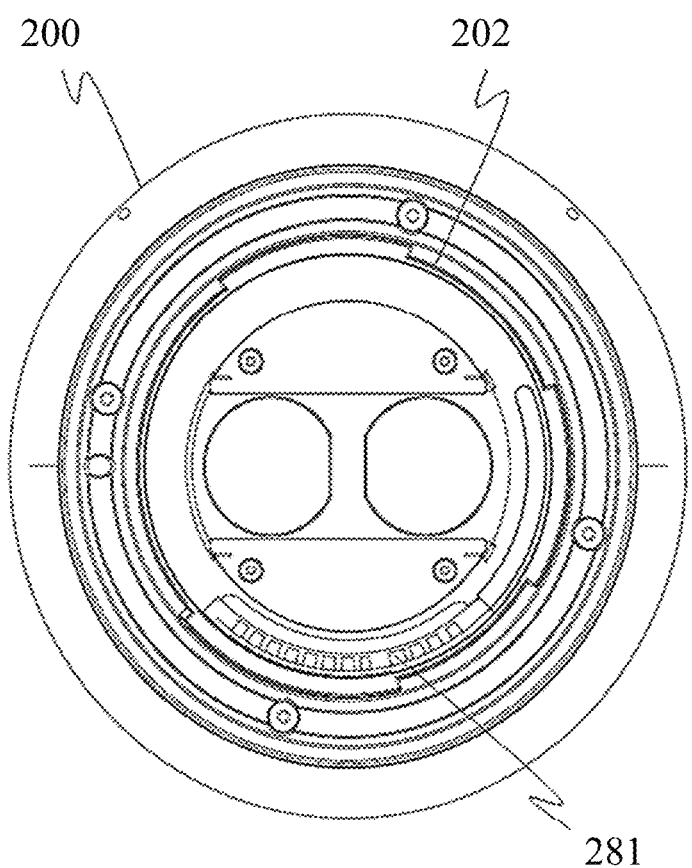
FIG. 18 is a bottom view of an interchangeable lens according to Example 7 viewed from a lens mount side.

FIG. 18 illustrates the interchangeable lens 200 according to this example viewed from the lens mount unit 202 side. This example will discuss only configurations different from those of Examples 1 to 6, and will omit a description of common configurations.

In FIG. 18, a contact 281 with the camera body 110 is disposed below the first optical system 201R and the second optical system 201L, and allows the camera body 110 and the interchangeable lens 200 to electrically communicate with each other. In this example, signals are exchanged between the camera body 110 and the interchangeable lens 200 through the contact 281.

Figure 19:
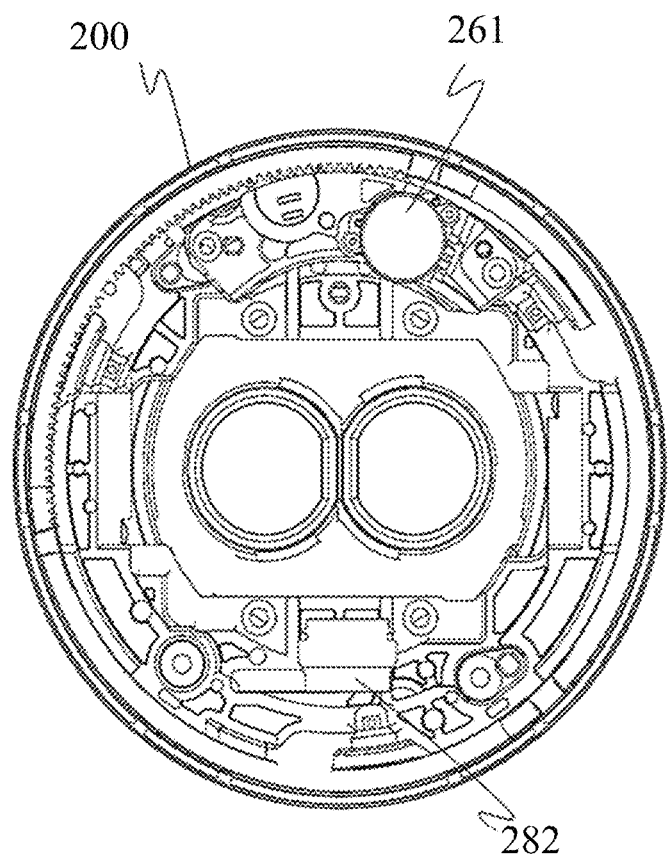
FIG. 19 is a top view of the interchangeable lens according to Example 7 viewed from an object side.

FIG. 19 illustrates the interchangeable lens 200 viewed from the object side. FIG. 19 omits unnecessary portions so that the location of the driving mechanism 261 can be viewed. Since a flexible printed circuit (FPC) board 282 is connected to the contact 281, the contact 281 and the FPC board 282 are disposed substantially in the same phase. In order to avoid electrical interference, the driving mechanism 261 and the contact 281 are disposed at positions different in phase by 180 degrees with respect to the center of the optical axis. The 180-degree difference includes not only a strict 180-degree difference, but also a substantial 180-degree difference (approximate 180-degree difference).

Figure 20:
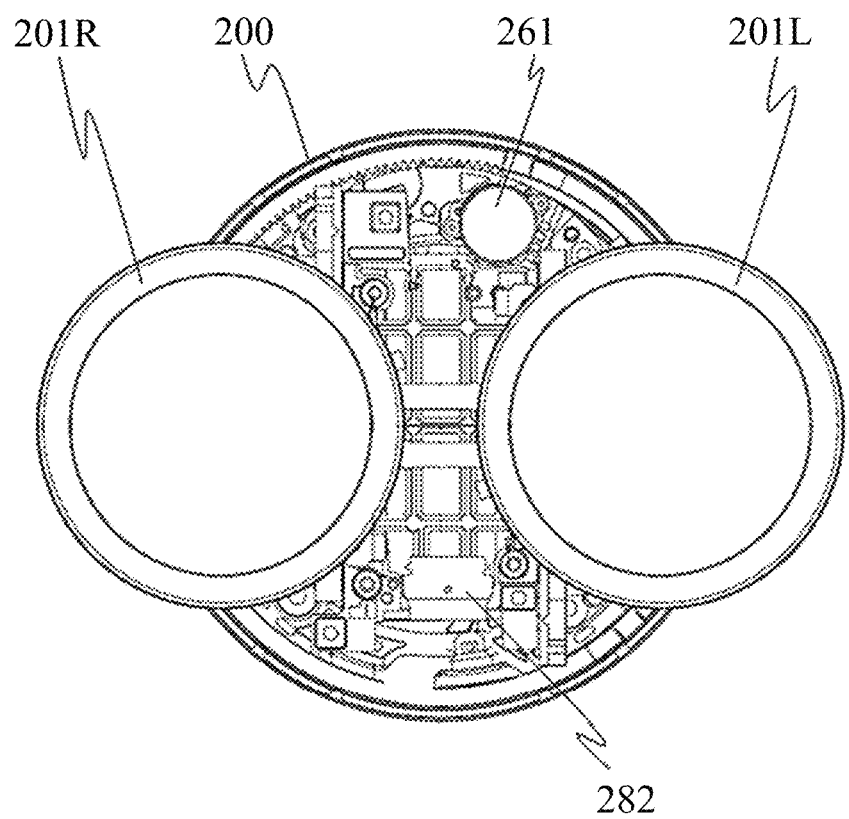
FIG. 20 is a top view of the interchangeable lens viewed from the object side, with the first optical system and the second optical system added to the configuration of FIG. 19 according to Example 7.

FIG. 20 is a top view of the interchangeable lens 200 viewed from the object side by adding the first optical system 201R and the second optical system 201L to the configuration of FIG. 19. The driving mechanism 261 is disposed outside the projection surface areas of the two optical systems. Disposing the driving mechanism 261 avoiding the space where the two optical systems are disposed, the space can be effectively utilized.

This embodiment can provide a control apparatus that can properly perform focusing of a plurality of optical systems.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Applications Nos. 2022-157404, filed on Sep. 30, 2022, and 2023-090520, filed on May 31, 2023, each of which is hereby incorporated by reference herein in their entirety.

What is claimed is:

1. A control apparatus for a camera system that includes a lens apparatus including a first optical system and a second optical system and configured to move the first optical system and the second optical system relative to each other, and an image pickup apparatus including an image sensor and attachable to and detachable from the lens apparatus, the control apparatus comprising:
a memory storing instructions; and
a processor configured to execute the instructions to:
acquire a first evaluation value of the first optical system at a first focus detection position corresponding to the first optical system,
determine a second focus detection position corresponding to the second optical system based on an first object image formed by the first optical system and a second object image formed by the second optical system,
acquire a second evaluation value of the second optical system at the second focus detection position, and
move the first optical system and the second optical system based on the first evaluation value and the second evaluation value.

2. The control apparatus according to claim 1, wherein the first focus detection position and the second focus detection position are imaging positions of a same object.

3. The control apparatus according to claim 1, wherein the processor is configured to determine the second focus detection position using the first focus detection position, a parallax amount between the first object image and the second object image, a distance between optical axes of the first optical system and the second optical system set closest to an imaging surface of the image sensor, and an optical axis shift due to mount attachment and detachment operations.

4. The control apparatus according to claim 1, wherein the processor is configured to determine the second focus detection position using feature point matching between the first object image and the second object image.

5. The control apparatus according to claim 1, wherein the processor is configured to acquire from the lens apparatus, information about the lens apparatus including information identifying whether the lens apparatus is a VR imaging lens.

6. The control apparatus according to claim 5, wherein the lens apparatus is determined to be the VR imaging lens, the processor acquires an error from a design value of the lens apparatus.

7. The control apparatus according to claim 6, wherein the error is an optical axis shift due to mount attachment and detachment operations of the lens apparatus.

8. The control apparatus according to claim 5, wherein the processor is configured to determine the second focus detection position in a case where the processor determines that the lens apparatus is the VR imaging lens.

9. The control apparatus according to claim 1, wherein the lens apparatus includes:
a first adjusting unit configured to simultaneously move the first optical system and the second optical system; and
a second adjusting unit configured to move the first optical system,
wherein the processor is configured to drive the first adjusting unit and the second adjusting unit based on a difference between the first evaluation value and the second evaluation value.

10. The control apparatus according to claim 9, wherein the processor is configured to drive one of the first adjusting unit and the second adjusting unit in a case where the difference is larger than a predetermined value, and then to drive the other of the first adjusting unit and the second adjusting unit.

11. The control apparatus according to claim 9, wherein the processor is configured to drive only the first adjusting unit in a case where the difference is smaller than a predetermined value.

12. The control apparatus according to claim 1, wherein the lens apparatus includes:
a third adjusting unit configured to move the first optical system; and
a fourth adjusting unit configured to move the second optical system,
wherein the processor is configured to drive the third adjusting unit based on the first evaluation value and to drive the fourth adjusting unit based on the second evaluation value.

13. A lens apparatus attachable to and detachable from an image pickup apparatus that includes an image sensor, the lens apparatus comprising:
a first optical system;
a second optical system; and
the control apparatus according to claim 1.

14. The lens apparatus of claim 13, further comprising:
a first adjusting unit configured to simultaneously move the first optical system and the second optical system; and
a second adjusting unit configured to move the first optical system.

15. The lens apparatus according to claim 14, wherein in a case where the lens apparatus is viewed from an object side, the first adjusting unit is disposed at a position different in phase from a contact with the image pickup apparatus by 180 degrees with respect to a center of the lens apparatus.

16. The lens apparatus according to claim 14, wherein in a case where the lens apparatus is viewed from an object side, the first adjusting unit is disposed outside projection surface areas of the first optical system and the second optical system.

17. The lens apparatus of claim 13, further comprising:
a third adjusting unit configured to move the first optical system; and
a fourth adjusting unit configured to move the second optical system.

18. The lens apparatus according to claim 17, wherein the third adjusting unit and the fourth adjusting unit are disposed on a same member.

19. The lens apparatus according to claim 17, wherein the third adjusting unit and the fourth adjusting unit are disposed point-symmetrically with respect to a center of the lens apparatus in a case where the lens apparatus is viewed from an object side.

20. The lens apparatus according to claim 17, further comprising:
a first detector configured to detect a position of the first optical system; and
a second detector configured to detect a position of the second optical system,
wherein the first detector and the second detector are disposed on a same member.

21. The lens apparatus according to claim 17, further comprising:
a first guide portion configured to guide the first optical system; and
a second guide portion configured to guide the second optical system,
wherein the first guide portion and the second guide portion are disposed on a same member.

22. An image pickup apparatus attachable to and detachable from a lens apparatus that includes a first optical system and a second optical system, and is configured to move the first optical system and the second optical system relative to each other, the image pickup apparatus comprising:
an image sensor; and
the control apparatus according to claim 1.

23. A camera system comprising:
a lens apparatus including a first optical system and a second optical system, and configured to move the first optical system and the second optical system relative to each other;
an image pickup apparatus including a single image sensor and attachable to and detachable from the lens apparatus; and
the control apparatus according to claim 1.

24. A control method for a camera system that includes a lens apparatus including a first optical system and a second optical system and is configured to move the first optical system and the second optical system relative to each other, and an image pickup apparatus that includes an image sensor and is attachable to and detachable from the lens apparatus, the control method comprising the steps of:
acquiring a first evaluation value of the first optical system at a first focus detection position corresponding to the first optical system,
determining a second focus detection position corresponding to the second optical system based on an first object image formed by the first optical system and a second object image formed by the second optical system,
acquiring a second evaluation value of the second optical system at the second focus detection position, and
moving the first optical system and the second optical system based on the first evaluation value and the second evaluation value.

25. A control apparatus for a camera system that includes a lens apparatus including a first optical system and a second optical system and is configured to move the first optical system and the second optical system relative to each other, and an image pickup apparatus that includes an image sensor and is attachable to and detachable from the lens apparatus, the control apparatus comprising:
a memory storing instructions; and
a processor configured to execute the instructions to:
acquire a first evaluation value of the first optical system at a first focus detection position corresponding to the first optical system, and move the first optical system and the second optical system based on the first evaluation value.

26. The control apparatus according to claim 25, wherein the lens apparatus includes:
a first adjusting unit configured to simultaneously move the first optical system and the second optical system; and
a second adjusting unit configured to move the first optical system,
wherein the processor drives the first adjusting unit based on the first evaluation value.

27. The control apparatus according to claim 25, wherein a second adjusting unit configured to move the first optical system adjusts a focus difference between the first optical system and the second optical system to be within a permissible range by sending an operation signal to the second adjusting unit through manual operation.

28. The control apparatus according to claim 25, wherein a second adjusting unit configured to move the first optical system adjusts a focus difference between the first optical system and the second optical system to be within a permissible range by operating the second adjusting unit through manual operation.

29. The control apparatus according to claim 25, wherein the lens apparatus includes:
a third adjusting unit configured to move the first optical system; and
a fourth adjusting unit configured to move the second optical system,
wherein the processor drives the third adjusting unit and the fourth adjusting unit based on the first evaluation value.

30. A lens apparatus attachable to and detachable from an image pickup apparatus that includes an image sensor, the lens apparatus comprising:
a first optical system;
a second optical system; and
the control apparatus according to claim 25.

31. The lens apparatus according to claim 30, further comprising:
a first adjusting unit configured to simultaneously move the first optical system and the second optical system; and
a second adjusting unit configured to move the first optical system.

32. The lens apparatus of claim 30, further comprising:
a third adjusting unit configured to move the first optical system; and
a fourth adjusting unit configured to move the second optical system.

33. An image pickup apparatus attachable to and detachable from a lens apparatus that includes a first optical system and a second optical system and is configured to move the first optical system and the second optical system relative to each other, the image pickup apparatus comprising:
an image sensor; and
the control apparatus according to claim 25.

34. A camera system comprising:
a lens apparatus including a first optical system and a second optical system, and configured to move the first optical system and the second optical system relative to each other;
an image pickup apparatus including a single image sensor and attachable to and detachable from the lens apparatus; and
the control apparatus according to claim 25.

35. A control method for a camera system that includes a lens apparatus that includes a first optical system and a second optical system and is configured to move the first optical system and the second optical system relative to each other, and an image pickup apparatus that includes an image sensor and is attachable to and detachable from the lens apparatus, the control method comprising the steps of:
acquiring a first evaluation value of the first optical system at a first focus detection position corresponding to the first optical system; and
moving the first optical system and the second optical system based on the first evaluation value.

* * * * *